(12) United States Patent
Taniuchi

(10) Patent No.: US 11,947,734 B2
(45) Date of Patent: Apr. 2, 2024

(54) APPARATUS AND METHOD FOR FORCE SENSING, AND ELECTRONIC DEVICE

(71) Applicant: GOERTEK INC., Shandong (CN)

(72) Inventor: Hirotada Taniuchi, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/320,630

(22) Filed: May 19, 2023

(65) Prior Publication Data
US 2023/0288992 A1 Sep. 14, 2023

Related U.S. Application Data

(63) Continuation of application No. PCT/CN2020/129974, filed on Nov. 19, 2020.

(51) Int. Cl.
*G06F 3/03* (2006.01)
*G01L 1/22* (2006.01)

(52) U.S. Cl.
CPC ............. *G06F 3/03* (2013.01); *G01L 1/2262* (2013.01); *G01L 1/2281* (2013.01)

(58) Field of Classification Search
CPC ........ G06F 3/0202; G06F 3/03; G06F 3/0338; G06F 3/03547; G06F 1/1643
See application file for complete search history.

(56) References Cited

U.S. PATENT DOCUMENTS

| 9,218,073 | B1* | 12/2015 | Kremin | ................. G06F 3/0446 |
| 2008/0170899 | A1* | 7/2008 | Nojiri | ................... B41J 11/009 400/56 |
| 2011/0259111 | A1 | 10/2011 | Ohsato | |
| 2015/0369682 | A1* | 12/2015 | Nakajima | ............. G01L 19/143 73/384 |

(Continued)

FOREIGN PATENT DOCUMENTS

| CN | 1049718 A | 3/1991 |
| CN | 101443597 A | 5/2009 |

(Continued)

OTHER PUBLICATIONS

International Search Report from International Application No. PCT/CN2020/129974 dated Aug. 19, 2021.

*Primary Examiner* — Ryan A Lubit
(74) *Attorney, Agent, or Firm* — Shih IP Law Group, PLLC

(57) ABSTRACT

An apparatus and a method for force sensing, and an electronic device. The apparatus includes at least one first sensor, at least one second sensor, and a comparator. The at least one first sensor generates a first signal, the at least one second sensor generates a second signal, and the comparator receives both the first signal and the second signal. The first signal is determined by deformation of a deformable portion and temperature at the deformable portion, and the second signal is determined by the temperature at the deformable portion. The comparator determines whether the deformable portion deforms based on the first signal, the second signal, and the threshold signal, and further generates the third signal which is in the active state in response to the determination being positive. The apparatus can make an accurate response when the deformation of the deformable portion serves as an input operation.

20 Claims, 10 Drawing Sheets

(56) References Cited

U.S. PATENT DOCUMENTS

| | | | | |
|---|---|---|---|---|
| 2016/0041048 A1* | 2/2016 | Blum | ............... | G06F 3/012 |
| | | | | 73/774 |
| 2016/0196421 A1* | 7/2016 | Kitada | ............... | G06F 21/31 |
| | | | | 455/411 |
| 2017/0089789 A1* | 3/2017 | Kanemoto | ............... | G01L 19/02 |
| 2021/0294457 A1* | 9/2021 | Lynn | ............... | G06F 3/016 |

FOREIGN PATENT DOCUMENTS

| | | | |
|---|---|---|---|
| CN | 101639391 | A | 2/2010 |
| CN | 102809682 | A | 12/2012 |
| CN | 105300411 | A | 2/2016 |
| CN | 105571691 | A | 5/2016 |
| CN | 106471435 | A | 3/2017 |
| CN | 106556489 | A | 4/2017 |
| CN | 107063523 | A | 8/2017 |
| CN | 108151919 | A | 6/2018 |
| CN | 111238698 | A | 6/2020 |
| EP | 3511146 | A2 | 7/2019 |
| IN | 102374917 | A | 3/2012 |

\* cited by examiner

APPARATUS AND METHOD FOR FORCE SENSING, AND ELECTRONIC DEVICE

TECHNICAL FIELD

The present disclosure is related to the technical field of human-computer interaction, and in particular, to an apparatus and a method for force sensing, and an electronic device.

BACKGROUND

Recent decades have witnessed fast development of various electronic devices in people's daily life. In order to facilitate utilization, lots of input apparatuses are developed to help users interact with the electronic devices. Force-sensitive or strain-sensitive input apparatuses are becoming more and more popular, since they provide quite convenient force-sensing approaches for the interaction between the users and various types of electronic devices. For example, users can input instructions to a mobile phone or a computer by simply touching, pressing, tapping, gripping, or stretching an operation interface with a finger or a stylus.

The operation interface provided with the force-sensitive or strain-sensitive input apparatus are generally located at a deformable portion of the electronic device, for example, a virtual keyboard or a virtual button on a flexible display, a resilient part of a plastic shell, a thinned part of a metal housing, etc. The force-sensitive or strain-sensitive input apparatus detects deformation of the operation interface, i.e., detects a force or a strain induced by the operation, and thereby enables the electronic device to recognize such operation. FIG. 1 is a schematic structural diagram of a force-sensitive or strain-sensitive input apparatus of an electronic device in conventional technology. As shown in FIG. 1, the force-sensitive or strain-sensitive input apparatus includes a force sensor 3 located at the operation interface 2 of the electronic device 1, and an analog-to-digital comparator (ADC) 4. The force sensor 3 is configured to generate an electrical signal and transmit the electrical signal to the ADC 4. The ADC 4 is configured to compare such signal with a threshold defined by a preset threshold signal, and output a signal of which a state indicates a result of the comparison. The threshold indicates a degree of deformation which is to be recognized by the electronic device. Then, the result is transmitted to a controller (or a processor) 5, and the controller (or the processor) 5 determines whether the operation region deforms, based on the state of the signal.

Generally, the force sensor reflects the force or the strain at the operation region by using an electrical characteristic of the force sensor, and the electrical characteristic is sensitive to temperature. For example, the electrical characteristic may be related to resistance, which strongly depends on temperature according to a temperature coefficient of resistance of a material of the force sensor. Similarly, the electrical characteristic related to inductance also depends on the temperature.

Fast development of the electronic devices further results in increasingly complicated temperature environment within the electronic devices. In one aspect, the miniaturization of the electronic devices brings a great challenge on heat dissipation, and the temperature within an enclosure would change drastically when the electronic device is switched among different operation modes, such as a turbo-mode, an eco-mode, and a sleeping mode. In another aspect, ambient temperature of the electronic devices is rather unstable given various application scenarios. For example, a wearable electronic device exchanges heat with a skin of human body, and thereby the temperature at a housing when a user does some sports is higher than that when the user takes a rest. For another example, an outdoor electronic device would be heated in sunny weather and cooled in cloudy or rainy weather.

Since the electrical characteristic, such as the resistance and the inductance, of the force sensor depends on the temperature, an output signal of the force sensor would drift from a theoretical value when the temperature is unstable. Even when there is no deformation at the operation interface, the result of the comparison at the ADC would indicate that the operation interface has deformed each time the drifting output signal reaches the threshold defined by the threshold signal. Consequently, the controller or the processor gives instructions based on erroneous detection, and the electronic device cannot work properly.

SUMMARY

In order to address the above technical issue, following technical solutions are provided according to embodiments of the present disclosure.

In a first aspect, an apparatus for force sensing is provided. The apparatus is located in an electronic device including a deformable portion, and includes at least one first sensor, at least one second sensor, and a comparator. The at least one first sensor is configured to generate a first signal, where the first signal is determined by deformation of a deformable portion and temperature at the deformable portion. The at least one second sensor is configured to generate a second signal, where the second signal is determined by the temperature at the deformable portion. The comparator is configured to receive the first signal and the second signal, determine whether the deformable portion deforms, based on the first signal, the second signal, and a threshold signal, and generate a third signal. The threshold signal corresponds to a degree of the deformation. The third signal is in an active state in response to determining that the deformable portion deforms.

In one embodiment, one of the first signal and the threshold signal is compensated based on the second signal, to generate a compensated signal. The comparator is further configured to generate the third signal by comparing the compensated signal with another of the first signal and the threshold signal.

In one embodiment, the at least one first sensor includes a first Wheatstone-bridge circuit and a first amplifier circuit. An arm of the first Wheatstone-bridge circuit includes a first strain-sensitive element, and the first strain-sensitive element is attached to the deformable portion. The first amplifier circuit includes a first operational amplifier, an inverting input terminal and a non-inverting input terminal of the first operational amplifier are coupled to two output terminals, respectively, of the first Wheatstone-bridge circuit, and an output terminal of the first operational amplifier is coupled to an input terminal of the comparator. The first signal includes a signal outputted from the output terminal of the first operational amplifier.

In one embodiment, the first strain-sensitive element is a strain gauge.

In one embodiment, the first strain-sensitive element includes two contacts separated by a gap, and a contact resistance between the two contacts changes monotonously with a width of the gap.

In one embodiment, the at least one second sensor includes a temperature sensor integrated circuit (IC), a thermopile, a thermal couple, or a thermal resistance.

In one embodiment, the apparatus further includes a buffer layer, configured to configured to buffer one or more of the at least one second sensor from the deformation of the deformable portion. The one or more second sensors include a second Wheatstone-bridge circuit and a second amplifier circuit. An arm of the second Wheatstone-bridge circuit comprises a second strain-sensitive element, and the second strain-sensitive element is attached to the buffer layer at a side away from the deformable portion. The second amplifier circuit comprises a second operational amplifier, an inverting input terminal and a non-inverting input terminal of the second operational amplifier are coupled to two output terminals, respectively, of the second Wheatstone-bridge circuit, and an output terminal of the second operational amplifier is coupled to another input terminal of the comparator. The second signal includes a signal outputted from the output terminal of the second operational amplifier.

In one embodiment, the second strain-sensitive element is identical to the first strain-sensitive element.

In one embodiment, the first signal is compensated based on the second signal, and the compensated signal is a difference between the first signal and the second signal.

In one embodiment. the one of the first signal and the threshold signal is compensated based on a look-up table, and the look-up table records a corresponding relationship between the compensated signal and the second signal.

In one embodiment, the threshold signal includes a threshold signal for compression. The comparator is further configured to determine whether the deformable portion is squeezed, based on the first signal, the second signal, and the threshold signal for compression. The third signal is in the active state in response to the deformable portion being squeezed.

In one embodiment, the threshold signal includes a threshold signal for tension. The comparator is further configured to determine whether the deformable portion is stretched, based on the first signal, the second signal, and the threshold signal for tension. The third signal is in the active state in response to the deformable portion being stretched.

In one embodiment, one of the at least one second sensor is attached to the deformable portion for contacting temperature sensing, or separated from the deformable portion by a gap for non-contacting temperature sensing. The one of the at least one second sensor is located in proximity to the first strain-sensitive element.

In one embodiment, one of the at least one second sensor is attached to at least a part of the first strain-sensitive element for contacting temperature sensing, or separated from at least a part of the first strain-sensitive element for non-contacting temperature sensing, at a side away from the deformable portion.

In one embodiment, a quantity of the at least one first sensor is one, and a quantity of the at least one second sensor is more than one, and the second signal is obtained based on output signals from all second sensors.

In one embodiment, the second signal is obtained based on an average of the output signals from all second sensors.

In one embodiment, the second signal is obtained based on a weighted average of the output signals from all second sensors, and a weight of each output signal is determined by a distance between the first sensor and the corresponding second sensor.

In one embodiment, a quantity of the at least one first sensor is more than one, and each of the at least one first sensor corresponds to one of the at least one second sensor. The first sensors are located at different regions of the deformable portion. The comparator is further configured to determine whether each of the different regions deforms, based on an output signal of the corresponding first sensor, an output signal of the corresponding second sensor, and the threshold signal.

In a second aspect, an electronic device is provided according to an embodiment of the present disclosure, including any of the aforementioned apparatuses, the deformable portion, and a hardware module. The hardware module is configured to receive the third signal, and a state of the hardware module changes in response to the third signal being in the active state.

In one embodiment, the hardware module includes at least one of: a processor, a controller, a display, a speaker, a switch, or an indicator light.

In one embodiment, the electronic device includes at least one of: a mobile phone, a watch, glasses, an earbud, a keyboard, or a tablet.

In a third aspect, a method for force sensing is provided. The method is applied to an electronic device, and includes: generating, by at least one first sensor, a first signal based on deformation of a deformable portion of the electronic device and temperature at the deformable portion; generating, by at least one second sensor, a second signal based on the temperature at the deformable portion; receiving the first signal and the second signal, by comparator; determining, by the comparator based on the first signal, the second signal, and a threshold signal, whether the deformable portion deforms, wherein the threshold signal corresponds to a degree of the deformation; and generating a third signal by the comparator, wherein the third signal is in an active state in response to determining that the deformable portion deforms.

According to above embodiments of the present disclosure, the at least one first sensor generates the first signal, the at least one second sensor generates the second signal, and the comparator receives both the first signal and the second signal. The first signal is determined by the deformation of the deformable portion and temperature at the deformable portion, and the second signal is determined by the temperature at the deformable portion. The comparator determines whether the deformable portion deforms based on the first signal, the second signal, and the threshold signal, and further generates the third signal which is in the active state in response to the determination being positive. With the aid of the second sensor, the comparator is capable to apply the second signal to eliminate the influence of the temperature on the first signal, and make proper comparison between the first signal and the threshold signal. Therefore, the determination of the comparator is immune or insensitive to the temperature at the deformable portion, and the active state of the third signal can indicate the deformation of the deformable portion accurately. Correspondingly, the electronic device applying the apparatus can make an accurate response when the deformation of the deformable portion serves as an input operation.

BRIEF DESCRIPTION OF THE DRAWINGS

Hereinafter briefly described are the drawings to be applied in embodiments of the present disclosure or conventional techniques. Other drawings may be obtained by those skilled in the art based on the provided drawings without creative efforts.

DETAILED DESCRIPTION OF THE EMBODIMENTS

Hereinafter technical solutions in embodiments of the present disclosure are described in conjunction with the drawings in embodiments of the present disclosure. It is appreciated the described embodiments are only some rather than all of the embodiments of the present disclosure. Any other embodiments obtained based on the embodiments of the present disclosure by those skilled in the art without any creative effort fall within the scope of protection of the present disclosure.

As described in the background, a conventional force-sensitive or strain-sensitive input apparatus is subject to drifting output signals of the force sensor, and thereby gives incorrect result regarding whether the operational interface deforms. Hereinafter, part of details of such technical issue are described, where it is taken as example that the force sensor is based on a strain gauge. Those skilled in the art would appreciate that such technical issue is also applicable mutatis mutandis to other types of force sensor, as long as the force sensor is temperature-sensitive.

Figure 2:
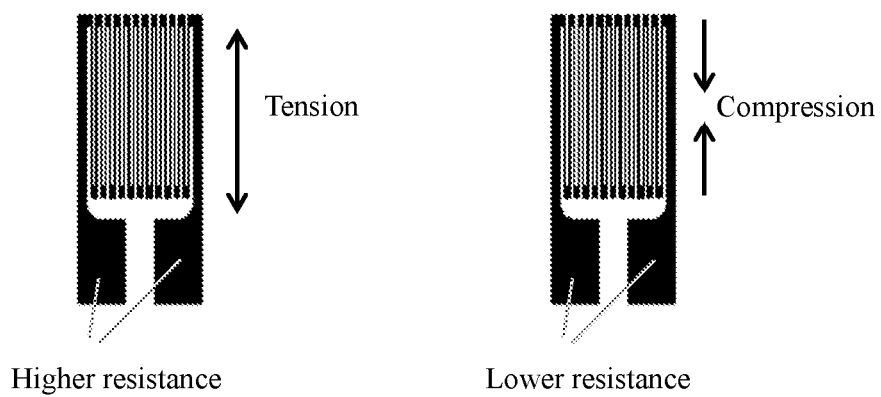
FIG. 2 is a schematic diagram of a strain gauge and operating states of the strain gauge in conventional technology.

Reference is made to FIG. 2, which is a schematic diagram of a strain gauge and operating states of the strain gauge in conventional technology. A strain gauge is configured to measure a strain on an object. A common type of strain gauge may consist of an insulating flexible backing which supports a metallic foil pattern, as shown in FIG. 2. The metallic foil pattern includes a winding pattern, of which a thickness is sensitive to strain, and two terminals at two ends of the winding pattern. The strain gauge may be attached to the object by a suitable adhesive. The foil pattern would deform when the object deforms, and an electrical resistance of the foil pattern changes accordingly. Generally, a compression on the object would thicken the metallic foil pattern, and thereby a resistance of the strain gauge is decreased. On the contrary, a tension on the object would thin the metallic foil pattern, and thereby a resistance of the strain gauge is increased. In practice, the two terminals may be connected into an arm of a Wheatstone bridge, which is a common approach for measuring a resistance.

A typical structure of the Wheatstone bridge includes an upper arm and a lower arm, each of which includes two resistors connected at a common node. Three of the four resistors are of fixed resistances, while the other is of a variable (or to-be-measured) resistance. Two ends of the upper arm are connected to two ends of the lower arm, respectively, and the two connection nodes serve as two output terminals of the Wheatstone bridge. The two common nodes in the upper arm and the lower arm serve as power supply terminals to the Wheatstone bridge. Therefore, in a case that the resistance of the three resistors and a voltage across the two power supply terminals are known, the to-be-measured resistance can be deduced from a voltage between the two output terminals. Those skilled in the art can easily obtain other variants of a Wheatstone-bridge circuit, which are not described in detail herein.

Figure 1:
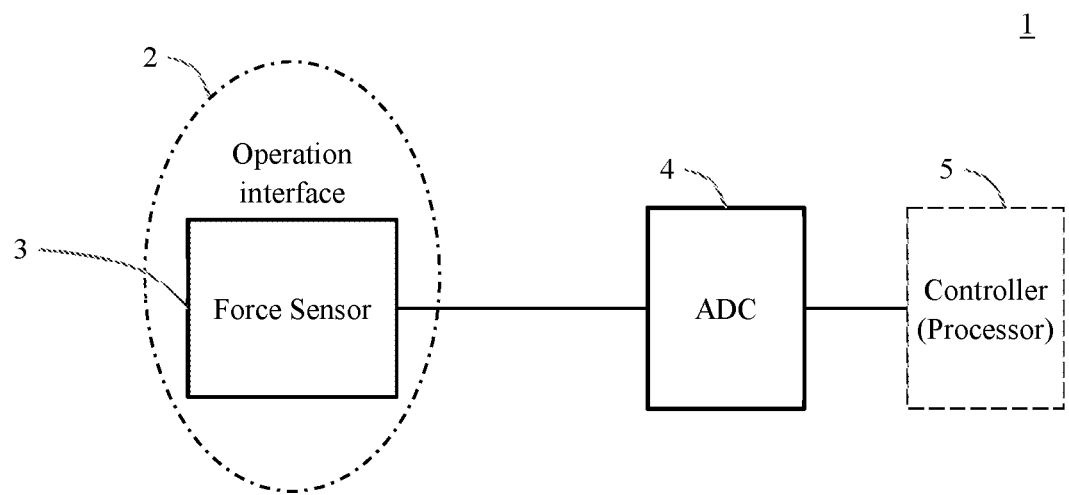
FIG. 1 is a schematic structural diagram of a force-sensitive or strain-sensitive input apparatus of an electronic device in conventional technology.
Figure 3:
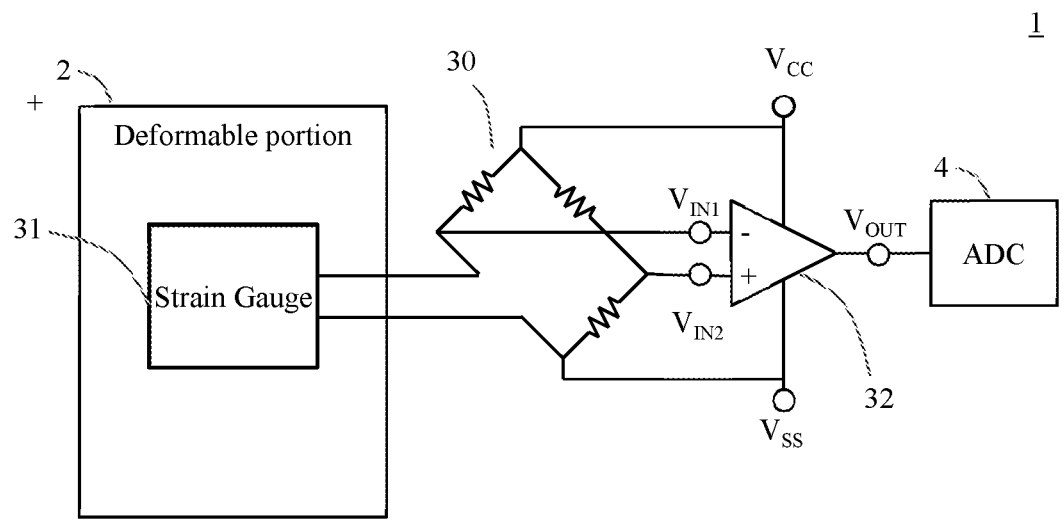
FIG. 3 is a schematic structural diagram of a force-sensitive or strain-sensitive input apparatus based on a strain gauge and a Wheatstone bridge.

Reference is then made to FIG. 3, which is a schematic structural diagram of a force-sensitive or strain-sensitive input apparatus based on a strain gauge and a Wheatstone bridge. The structure as shown in FIG. 3 is on a basis of that shown in FIG. 1, where the force sensor 3 includes a Wheatstone-bridge circuit 30 and an operational amplifier 32. A lower arm of the Wheatstone-bridge circuit 30 includes a strain gauge 31, which serves as the variable (or to-be-measured) resistor, and the strain gauge 31 is disposed on a deformable portion (such as an operation interface) 2 of the electronic device 1. The two output terminals of the Wheatstone-bridge circuit 30 are coupled to an inverting input terminal and a non-inverting input terminal of the operational amplifier 32, respectively. An output terminal of the operational amplifier 32 is coupled to an input terminal of the analog-to-digital converter (ADC) 4. In FIG. 3, signals at the inverting input terminal, the non-inverting input terminal, and the output terminal of the operational amplifier 32 are denoted as $V_{IN1}$, $V_{IN2}$, and $V_{OUT}$, respectively. There is $V_{OUT}=A*(V_{IN1}-V_{IN2})$, where A is the gain of the operational amplifier 32.

Figure 4:
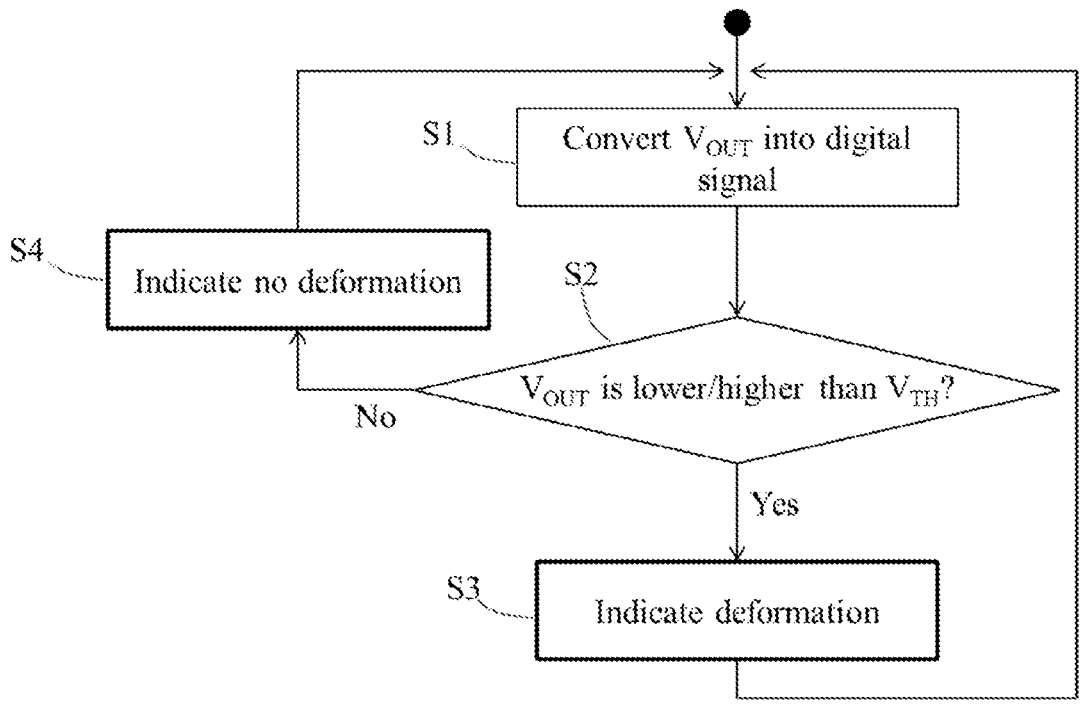
FIG. 4 is an operation algorithm of the comparator operating based on a strain gauge and a Wheatstone bridge.

The ADC may be provided with an algorithm for determining whether the deformable portion 2 deforms, on a basis of the structure as shown in FIG. 3. Reference is made to FIG. 4, which is an operation algorithm of the ADC operating based on a strain gauge and a Wheatstone bridge. In FIG. 4, the operation algorithm includes steps S1 to S4.

In step S1, the output signal $V_{OUT}$ is converted into a digital signal.

The operational amplifier amplifies a difference between the input signals $V_{IN1}$ and $V_{IN2}$ simply to generate the output signal $V_{OUT}$. Therefore, the output signal $V_{OUT}$ is an analog signal. As mentioned in the background, the ADC is configured to compare the output signal $V_{OUT}$ with a threshold signal $V_{TH}$. Generally, a signal should be digital for comparison, and thereby the ADC needs to perform analog-to-digital conversion on the output signal $V_{OUT}$. The threshold signal $V_{TH}$ may be preset as a digital level in the ADC, or may be a digital signal inputted into the ADC. The threshold signal $V_{TH}$ may alternatively be an analog signal inputted into the ADC. In such case, the ADC is further configured to convert the threshold signal $V_{TH}$ into a digital signal.

In step S2, it is determined whether the output signal $V_{OUT}$ is lower (or higher) than the threshold signal $V_{TH}$. The algorithm goes to step S3 in case of positive determination, and goes to step S4 in case of negative determination.

For convenience of illustration, it is assumed that the two input signals $V_{IN1}$ and $V_{IN2}$ of the operational amplifier 32 are balanced, namely, identical in value, in a case that the strain gauge 31 is in a zero-strain state. The zero-strain state refers to that the strain gauge 31 is subject to neither tension nor compression. Those skilled in the art can appreciate various manners to implement such assumption. For example, in FIG. 3, a ratio of a resistance of the left resistor in the upper arm to a resistance of the strain gauge 31 in the zero-strain state is equal to a ratio of a resistance of the right resistor in the upper arm to a resistance of the right resistor in the lower arm. The output signal $V_{OUT}$ of the operational amplifier 32 in case of the zero-strain state is denoted as a reference signal $V_{REF}$. In the aforementioned case, there is $V_{REF}=0$. In a case that the strain gauge 31 is subject to tension or compression, there would be $V_{OUT}>0$ or $V_{OUT}<0$, depending on a material of the strain gauge 31 and a connection manner between the Wheatstone-bridge circuit 30 and the operational amplifier 32. It is appreciated that the reference signal $V_{REF}$ may be another value when the resistances in the Wheatstone-bridge structure are configured in other manners.

Figure 5:
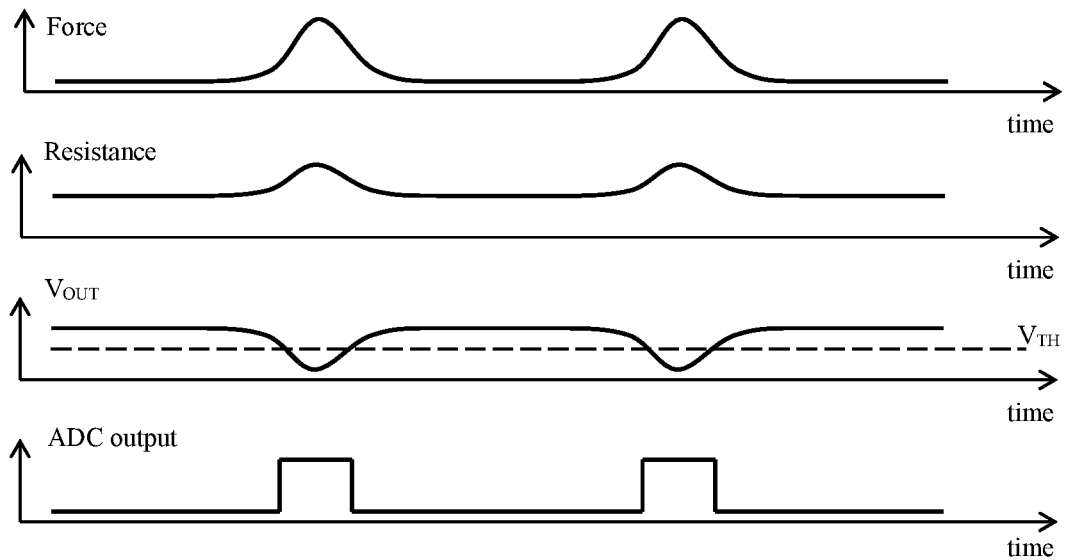
FIG. 5 is a schematic graph of a change in signals with respect to a force applied on a deformable portion.

Reference is made to FIG. 5, which is a schematic diagram of a change in signals with respect to a force (or a strain) at a deformable portion. It is taken as an example that the deformation of the deformable portion 2 is induced by an external force, of which a temporal profile is Gaussian-like. In a case that the deformable portion 2 is stretched (for example, a flat surface expanded due to a poke or a press applied by a user), the strain gauge 31 is subject to tension, and thereby the resistance of the strain gauge increases while the resistances of the three resistors in the Wheatstone-bridge circuit is not changed. Assuming the signal $V_{CC}$ is higher than the signal $V_{SS}$ in voltage, the inverting input signal $V_{IN1}$ is increased, while the non-inverting input signal Vim is unchanged. Accordingly, the output signal $V_{OUT}$ is decreased. In order to discriminate an effective stretch from an unintentional stretch or a noise signal, the threshold signal $V_{TH}$ may be set as a level lower than the reference signal $V_{REF}$ (namely, $V_{TH}<0$ in the aforementioned case).

In step S3, the ADC indicates that the deformable portion deforms.

In step S4, the ADC indicates that the deformable portion does not deform.

Reference is further made to FIG. 5. In a case that the output signal $V_{OUT}$ is lower than the threshold signal $V_{TH}$, it means that the deformation (the tension, or the stretch) is strong enough to be recognized as an effective input signal (for example, a user press a virtual button firmly to switch an electronic device on), and an output signal of the ADC 4 would turn a high level to inform the controller (or the processor) 5 to perform an operation corresponding to the deformation (for example, switching the electronic device on). In a case that the output signal $V_{OUT}$ is higher than or equal to the threshold signal $V_{TH}$, it means that the deformation (the tension, or the stretch) is not strong enough to be recognized as an effective input signal (for example, a user touch the virtual button unintentionally), and an output signal of the ADC 4 would turn a low level and do not inform the controller (or the processor) 5 to perform the corresponding operation. In other words, the ADC 4 is capable to indicate whether the deformable portion deforms through a state of the output signal of the ADC 4.

The accuracy of the above algorithm depends on that the resistance of the strain gauge 31 can accurately reflect information of the force (or strain) at the deformable region. Such accuracy deteriorates when taking into the account that the force sensor 3 is sensitive to temperature.

Generally, the temperature coefficient of resistance of metal materials is greater than zero. Since the strain gauge 31 is attached to the deformable portion 2, the resistance of the metallic foil pattern in the strain gauge 31 is in a positive correlation with the temperature of the deformable portion 2. That is, a rise in resistance is expected when the temperature of the deformable portion 2 increases, and a drop in resistance is expected when the temperature of the deformable portion 2 decreases.

Figure 6:
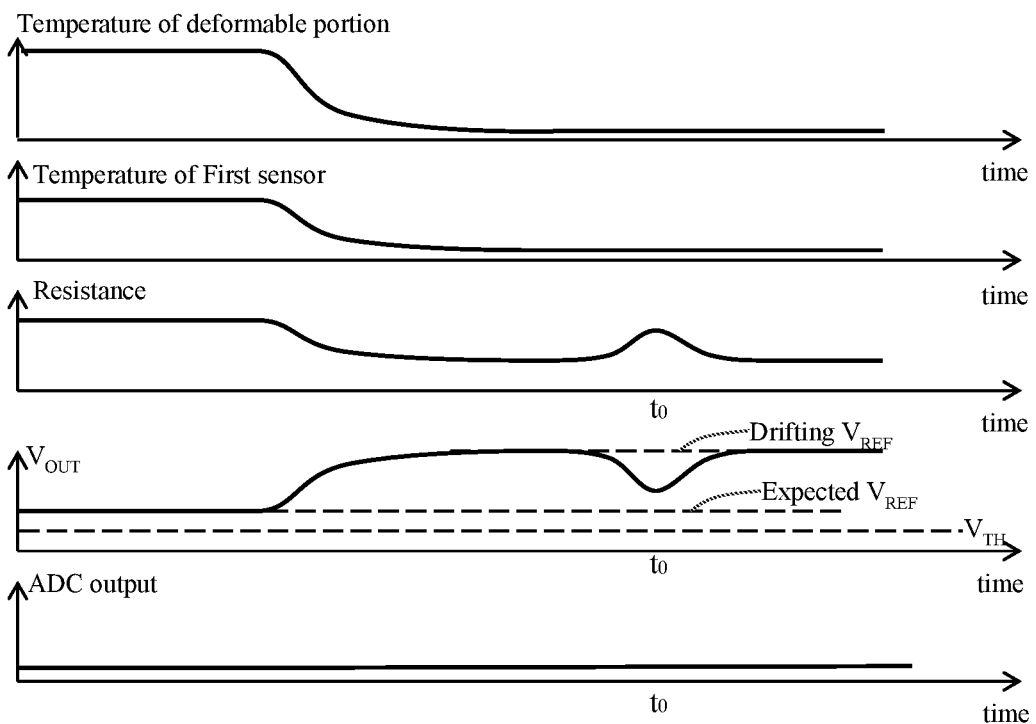
FIG. 6 is a schematic graph of a change in signals with respect to a force and temperature at a deformable portion.

Reference is made to FIG. 6, which is a schematic diagram of a change in signals with respect to a force (or a strain) and temperature at a deformable portion. It is taken as an example in FIG. 6 that temperature of the deformable portion 2 is subject to a gradual decrease. For example, the temperature of the deformable portion close to a central processing unit (CPU) may be decreased when the electronic device is switched from a turbo-mode to an eco-mode, or the temperature of the deformable portion attached to a metal housing may be decreased when a wearable device is detached from the human body. Apparently, the temperature of the strain gauge 31 would follow a similar change in that of the deformable portion 2, and the resistance of the strain gauge 31 is decreased accordingly. In such case, the inverting input signal $V_{IN1}$ is gradually decreased even when there is no squeeze (or tension) applied on the deformable portion 2, and thereby the actual reference signal $V_{REF}$ would drift to a level higher than the expected reference signal $V_{REF}$.

Around a moment $t_0$ when the temperature has already been decreased, an external force same as the one induces the deformation as shown in FIG. 5 is applied to the deformable portion and serves an input operation. The force leads to a valley similar to those in FIG. 5. Namely, the output signal $V_{OUT}$ should dip from the reference signal $V_{REF}$ to a level lower than the threshold defined by the threshold signal $V_{TH}$, in a case that the reference signal $V_{REF}$ remains at an expected value. Nevertheless, since the reference signal $V_{REF}$ has drifted to a level above the expected value, a difference between the actual (drifting) reference signal $V_{REF}$ and the threshold signal $V_{TH}$ is enlarged, and even a bottom of the valley may not reach the threshold defined by the threshold signal $V_{TH}$. Accordingly, a result of the comparison of the ADC 4 indicates that the output signal $V_{OUT}$ is kept higher than the threshold signal $V_{TH}$, therefore the ADC 4 would not turn the output signal thereof into an active state (such as a high level), and the controller (or processor) 5 is not informed of the deformation of the deformable portion. As a result, the electronic device may "miss" the input operation around the moment $t_0$ and give no response.

According to embodiments of the present disclosure, a novel structure of an apparatus for force sensing is proposed, where another sensor is incorporated to provide temperature information that participates in the comparison of a comparator.

Figure 7:
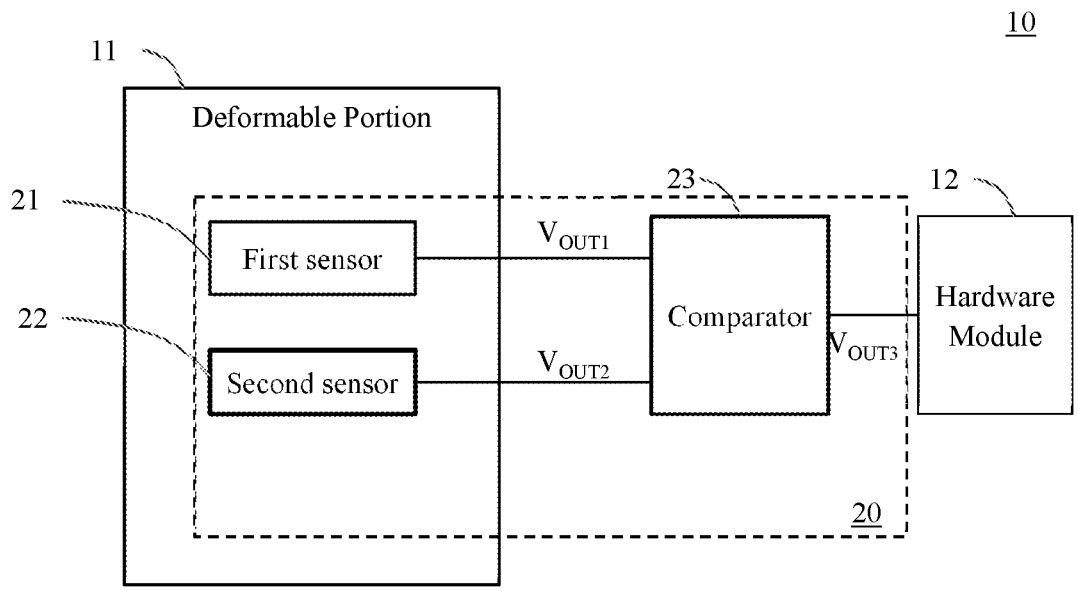
FIG. 7 is a schematic structural diagram of an electronic device applying an apparatus for force sensing according to an embodiment of the present disclosure.

Reference is made to FIG. 7, which is a schematic structural diagram of an electronic device applying an apparatus for force sensing according to an embodiment of the present disclosure. An apparatus 20 for force sensing is applied in an electronic device 10, and the electronic device 10 includes a deformable portion 11. The electronic device 10 may include a mobile phone, a watch, glasses, an earbud, a keyboard, a tablet, or the like. The deformable portion may be a flexible display of a mobile phone, a wristband of a watch, an elastic frame of glasses, a metal or plastic housing of an earbud, a membrane of a keyboard, a resilient home key of a tablet, or the like. It is appreciated that the electronic device 10 and the deformable portion 11 are not limited to the above cases, and specific examples are not numerated herein for conciseness.

The apparatus 20 includes at least one first sensor 21, at least one second sensor 22, and a comparator 23. In order to facilitate illustration, merely one of the at least one first sensor 21 and one of the at least one second sensor 22 are shown in FIG. 7. Unless otherwise described, those skilled in the art can appreciate that following description regarding one first sensor 21 and one second sensor 22 are also applicable mutatis mutandis to a case of multiple first sensors 21 or multiple second sensors 22.

The at least one first sensor 21 is configured to generate a first signal $V_{OUT1}$, and the first signal $V_{OUT1}$ is determined by deformation of the deformable portion 11 and temperature at the deformable portion 11. The first sensor 21 may be implemented in various forms, as long as the first signal $V_{OUT1}$ generated by the first sensor 21 is sensitive to both deformation and temperature of the deformable portion 11.

In one embodiment, the at least one first sensor 21 may include a Wheatstone-bridge circuit and an amplifier circuit. An arm of the Wheatstone-bridge circuit includes a strain-sensitive element, and the strain-sensitive element is attached to the deformable portion 11. The amplifier circuit includes an operational amplifier. An inverting input terminal and a non-inverting input terminal of the operational amplifier are coupled to two output terminals, respectively, of the Wheatstone-bridge circuit, and an output terminal of the operational amplifier is coupled to an input terminal of the comparator. The first signal $V_{OUT1}$ includes a signal outputted from the output terminal of the operational amplifier.

In this embodiment, the strain-sensitive element is mainly configured to detect the deformation of the deformable portion 11. The detection is implemented through an electrical characteristic of the strain-sensitive element, which is influenced by the deformation of the deformable portion 11. For example, the electrical characteristic is related to a resistance, an inductance, or a capacitance of the strain-sensitive element. The Wheatstone-bridge circuit is an efficient approach to accurately measure the electrical characteristic of the strain-sensitive element, especially when the electrical characteristic is related to the inductance or the capacitance. It is appreciated that the Wheatstone-bridge circuit may be replaced by another appropriate circuit according to a practical situation of the electrical characteristic.

In one embodiment, the electrical characteristic of the strain-sensitive element is related to resistance or inductance. For example, the strain-sensitive element is a strain gauge. For another example, the strain-sensitive element includes two contacts separated by a gap, and a contact resistance (or inductance) between the two contacts changes monotonously with a width of the gap.

The amplifier circuit is mainly configured to amplify a measurement signal outputted from the Wheatstone-bridge circuit, so as to acquire the first signal $V_{OUT1}$. In one embodiment, the amplification is implemented by the operational amplifier. The operational amplifier may be connected in various manners, for example, in an open-loop mode, in a closed-loop mode, in a negative-feedback mode, in a low-pass filter mode, or in an integrator-circuit mode. The present disclosure is not limited thereto, and another connection manner may be applicable as long as the measurement signal outputted from the Wheatstone-bridge circuit can be amplified.

Generally, the electrical characteristic of the strain-sensitive element is sensitive to temperature of the deformable portion 11. Therefore, even if the measurement of Wheatstone-bridge circuit (or another measurement circuit) and the amplification of the amplifier circuit are accurate, the first signal $V_{OUT1}$ may not reflect the deformation accurately due to its dependency on the temperature.

The at least one second sensor 22 is configured to generate a second signal $V_{OUT2}$, and the second signal $V_{OUT2}$ is determined by the temperature at the deformable portion. The second sensor 22 may be implemented in various forms, as long as the second signal $V_{OUT2}$ generated by the second sensor 22 is sensitive to temperature of the deformable portion 11. The second sensor 22 may be an analog sensor, and correspondingly the second signal $V_{OUT2}$ is an analog signal. Alternatively, the second sensor 22 may be a digital sensor which is provided with a digital interface (such as an inter-integrated circuit interface or a serial peripheral interface), and correspondingly the second signal $V_{OUT2}$ is a digital signal. The digital interface may be a part of the second sensor or a part of the comparator 23.

In one embodiment, the second sensor 22 may be insensitive to the deformation of the deformable portion 11. Since the second sensor 22 should reflect the temperature of the deformable portion 11 as accurate as possible, the second sensor is generally located inside or in proximity to the deformable portion. In such case, the second sensor 22 and the first sensor 21 may operate under different mechanisms, namely, may be of different types. For example, the second sensor 22 may be a temperature sensor IC, a thermopile, a thermal couple, or a thermal resistance.

In another embodiment, the second sensor 22 and the first sensor 21 may be of a same type. Therefore, the second sensor 22 and the first sensor 21 may be prepared in a same process, which facilitates fabrication of the apparatus 20. In such case, it is preferable that the second sensor 22 is insensitive to the deformation of the deformable portion 11 as much as possible. For example, the apparatus 20 further includes a buffer layer, and the buffer layer is configured to buffer one or more of the second sensor 22 from the deformation of the deformable portion. For another example, the deformable portion may be a sheet of material, such as a film or a membrane, and the second sensor includes two sub-sensors located at two opposite sides of a same position on the sheet. In a case that one sub-sensor is subject to a tensile force, the other sub-sensor is subject to a corresponding compressive force, and therefore information of the deformation may be neutralized in the second signal $V_{OUT2}$ by combining output signals from the two sub-sensors. Other manners of eliminating an influence of the deformation on the second sensor 22 may also be applicable.

In one embodiment, the second sensor 22 and the first sensor 21 may be identical to each other.

The comparator 23 is configured to receive the first signal $V_{OUT1}$ and the second signal $V_{OUT2}$. It is appreciated that the reception of the first signal $V_{OUT1}$ and the second signal $V_{OUT2}$ may be implemented by coupling output terminals of the first sensor 21 and the second sensor 22 to input terminals of the comparator 23. The comparator 23 may be an analog-to-digital comparator, or may include an analog-to-digital converter and a processor for comparing digital signals.

The comparator is further configured to determine whether the deformable portion 11 deforms, based on the first signal $V_{OUT1}$, the second signal $V_{OUT2}$, and a threshold signal $V_{TH}$. The threshold signal $V_{TH}$ corresponds to a degree of the deformation which is to be recognized by the electronic device 10. The threshold signal $V_{TH}$ may be preset as a digital level in the comparator 23, or may be a digital signal inputted into the comparator 23. Alternatively, the threshold signal $V_{TH}$ may be an analog signal inputted into the comparator 23, and the comparator 23 converts the threshold signal $V_{TH}$ into a digital signal before applying the threshold signal $V_{TH}$.

The comparator 23 may determine whether the deformable portion 11 deforms in various manners. In one embodiment, the determination is carried out by comparing levels of the first signal $V_{OUT1}$, the second signal $V_{OUT2}$, and the threshold signal $V_{TH}$. As discussed above, the temperature at the deformable portion 11 has an influence on comparison between the first signal $V_{OUT1}$ and the threshold signal $V_{TH}$, which results in erroneous determination of the deformation. Since the second signal $V_{OUT2}$ reflects the temperature at the deformable portion 11, it can serve as a basis for compensating such influence. That is, either the first signal $V_{OUT1}$ or the threshold signal $V_{TH}$ may be compensated based on the second signal $V_{OUT2}$ before the comparison. For example, the comparator may compensate the first signal $V_{OUT1}$ based on the second signal $V_{OUT2}$, and compares the compensated first signal $V_{OUT1}$ and the threshold signal $V_{TH}$ to determine whether the deformable portion 11 deforms. For another example, the comparator may compensate the threshold signal $V_{TH}$ based on the second signal $V_{OUT2}$, and compares the first signal $V_{OUT1}$ and the compensated threshold signal $V_{TH}$ to determine whether the deformable portion 11 deforms.

The comparator 23 is further configured to generate a third signal $V_{OUT3}$, and the third signal $V_{OUT3}$ is in an active state in response to determining that the deformable portion deforms. The specific active state of the third signal $V_{OUT3}$ is based on a practical situation, which is not limited herein, as long as the active state is distinguishable in the third signal $V_{OUT3}$ and serves as an indication of the deformation of the deformable portion 11. For example, the active state may be a high level or "1", or may be a low level or "0".

Figure 8:
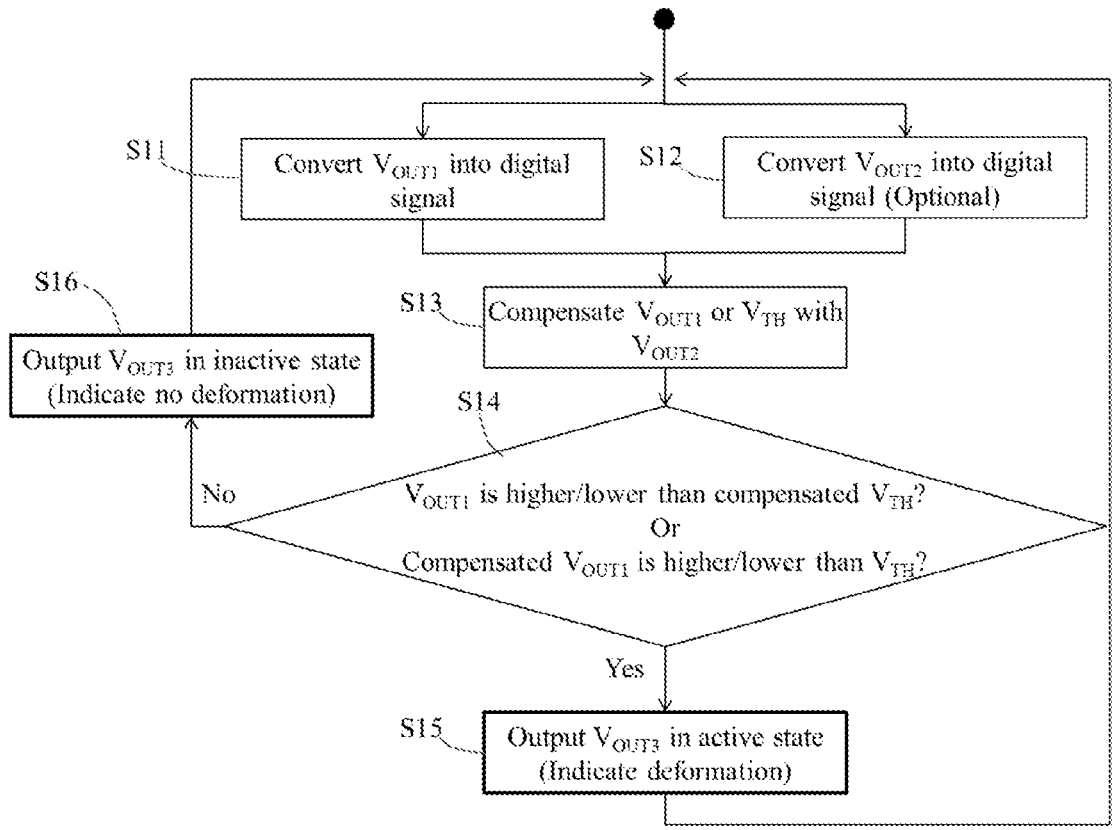
FIG. 8 is an operation algorithm of a comparator of an apparatus for force sensing according to an embodiment of the present disclosure.

Corresponding to the above functions, an operating algorithm of the comparator 23 may be as shown in FIG. 8. In FIG. 8, the operating algorithm of the comparator 23 includes steps S11 to S16.

In step S11, the first signal $V_{OUT1}$ is converted into a digital signal.

In step S12, the second signal $V_{OUT2}$ is converted into a digital signal. It is appreciated that the step S12 may be omitted in a case that the second signal $V_{OUT2}$ is a digital signal.

The first signal $V_{OUT1}$ is an analog signal when outputted from the first sensor 21. The second signal $V_{OUT2}$ may be an analog signal when outputted from the second sensor 22. Generally, a signal should be digital for comparison or calculation. Therefore, the comparator 23 needs to perform analog-to-digital conversion on the first signal $V_{OUT1}$ (or the first signal $V_{OUT1}$ and the second signal $V_{OUT2}$), before the determination based on the two signals and the threshold signal $V_{TH}$.

In step S13, the first signal $V_{OUT1}$ or the threshold signal $V_{TH}$ is compensated based on the second signal $V_{OUT2}$. In this step, the second signal $V_{OUT2}$ is applied to eliminate an influence of the temperature on the first signal $V_{OUT1}$. It is appreciated that in some embodiments, both the first signal $V_{OUT1}$ and the threshold signal $V_{TH}$ may be compensated partially based on the second signal $V_{OUT2}$, as long as information of the temperature in the first signal $V_{OUT1}$ and the second signal $V_{OUT2}$ can neutralize each other.

In step S14, it is determined whether the first signal $V_{OUT1}$ is lower (or higher) than the compensated threshold signal $V_{TH}$, or it is determined whether the compensated first signal $V_{OUT1}$ is lower (or higher) than the threshold signal $V_{TH}$. The operating algorithm goes to step S15 in case of positive determination, and goes to step S16 in case of negative determination.

Whether the determination concerns being lower than the threshold signal $V_{TH}$ or being higher than the threshold signal $V_{TH}$ depends on a practical situation. In a case that the deformation would cause a rise in the first signal $V_{OUT1}$, the threshold signal (or the compensated threshold signal) $V_{TH}$ is generally set to be a level higher than the compensated first signal (or the first signal) $V_{OUT1}$ at a referential state, and the determination is whether being higher the threshold signal $V_{TH}$. In a case that the deformation would cause a drop in the first signal $V_{OUT1}$, the threshold signal (or the compensated threshold signal) $V_{TH}$ is generally set to be a level lower than the compensated first signal (or the first signal) $V_{OUT1}$ at the referential state, and the determination is whether being lower than the threshold signal $V_{TH}$. The referential state refers to that the deformable portion is subject to no deformation or a preset referential degree of deformation. Hereinafter the compensated first signal $V_{OUT1}$ (or the first signal $V_{OUT1}$, when the threshold signal $V_{TH}$ is compensated) at the referential state is referred to as a reference signal $V_{REF}$.

It is noted that when the first signal $V_{OUT1}$ is equal to the compensated threshold signal $V_{TH}$ or the compensated first signal $V_{OUT1}$ is equal to the threshold signal $V_{TH}$, the comparator 23 may determine that the deformable portion 11 deforms, or determine that the deformable portion does not deform, according to a practical requirement.

In step S15, the third signal $V_{OUT3}$ is outputted in the active state. The active state indicates that the deformable portion 11 deforms.

In step S16, the third signal $V_{OUT3}$ is outputted in an inactive state. The inactive state is one or more states of the third signal $V_{OUT3}$ other than the active state, and indicates that the deformable portion 11 does not deform.

In one embodiment, the third signal $V_{OUT3}$ may be transmitted to a hardware module 12 of the electronic device 10. The hardware module 12 is configured to receive the third signal $V_{OUT3}$, and a state of the hardware module 12 changes in response to the third signal being in the active state In the apparatus 20 for force sensing according to above embodiments of the present disclosure, the at least one first sensor 21 generates the first signal $V_{OUT1}$, the at least one second sensor 22 generates the second signal $V_{OUT2}$, and the comparator 23 receives both the first signal $V_{OUT1}$ and the second signal $V_{OUT2}$. The first signal $V_{OUT1}$ is determined by the deformation of the deformable portion and temperature at the deformable portion 11, and the second signal $V_{OUT2}$ is determined by the temperature at the deformable portion 11. The comparator 23 determines whether the deformable portion 11 deforms based on the first signal $V_{OUT1}$, the second signal $V_{OUT2}$, and the threshold signal $V_{TH}$, and further generates the third signal $V_{OUT3}$ which is in the active state in response to the determination being positive. With the aid of the second sensor 22, the comparator 23 is capable to apply the second signal $V_{OUT2}$ to eliminate the influence of the temperature on the first signal $V_{OUT1}$, and make proper comparison between the first signal $V_{OUT1}$ and the threshold signal $V_{TH}$. Therefore, the determination of the comparator 23 is immune or insensitive to the temperature at the deformable portion 11, and the active state of the third signal $V_{OUT3}$ can indicate the deformation of the deformable portion 11 accurately. Correspondingly, the electronic device 10 applying the apparatus 20 can make an accurate response when the deformation of the deformable portion 11 serves as an input operation.

Hereinafter some embodiments are provided for better understanding of technical solutions of the present disclosure. The present disclosure is not limited to these embodiments.

Figure 9:
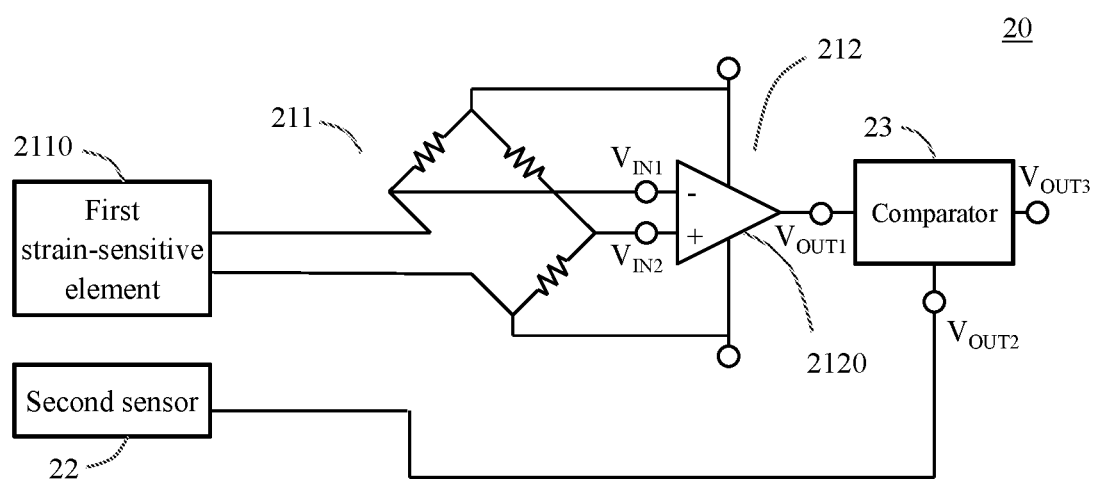
FIG. 9 is a schematic structural diagram of an apparatus for force sensing according to an embodiment of the present disclosure.

Reference is made to FIG. 9, which is a schematic structural diagram of an apparatus for force sensing according to an embodiment of the present disclosure. On a basis of the structure as shown in FIG. 7, the first sensor 21 includes a first Wheatstone-bridge circuit 211 and a first amplifier circuit 212. An arm of the first Wheatstone-bridge circuit 211 includes a first strain-sensitive element 2110, and the first strain-sensitive element 2110 is attached to the deformable portion 11. The first amplifier circuit 212 includes a first operational amplifier 2120. An inverting input terminal and a non-inverting input terminal of the first operational amplifier 2120 are coupled to two output terminals, respectively, of the first Wheatstone-bridge circuit 211, and an output terminal of the first operational amplifier 2120 is coupled to an input terminal of the comparator 23. The first signal $V_{OUT1}$ includes a signal outputted from the output terminal of the first operational amplifier 2120.

Those skilled in the art can appreciate that topologies of the first Wheatstone-bridge circuit 211 and the first amplifier circuit 212 are merely exemplary, and other variants of the topologies may be obtained without creative efforts. For example, any resistor in the first Wheatstone-bridge circuit 211 may be replaced by any quantity of resistors connected in series, parallel, or a combination of the two. For another example, the first operational amplifier 2120 may be connected in a closed-loop mode, a negative-feedback mode, a low-pass filter mode, or an integrator-circuit mode, instead of the depicted open-loop mode. Further, the connection between the two output terminals of the first Wheatstone-bridge circuit 211 and the two input terminals of the first operational amplifier 2120 may be switched, namely, the signal $V_{IN1}$ is inputted into the non-inverting input terminal while the signal $V_{IN2}$ is inputted into the inverting input terminal.

Figure 10A:
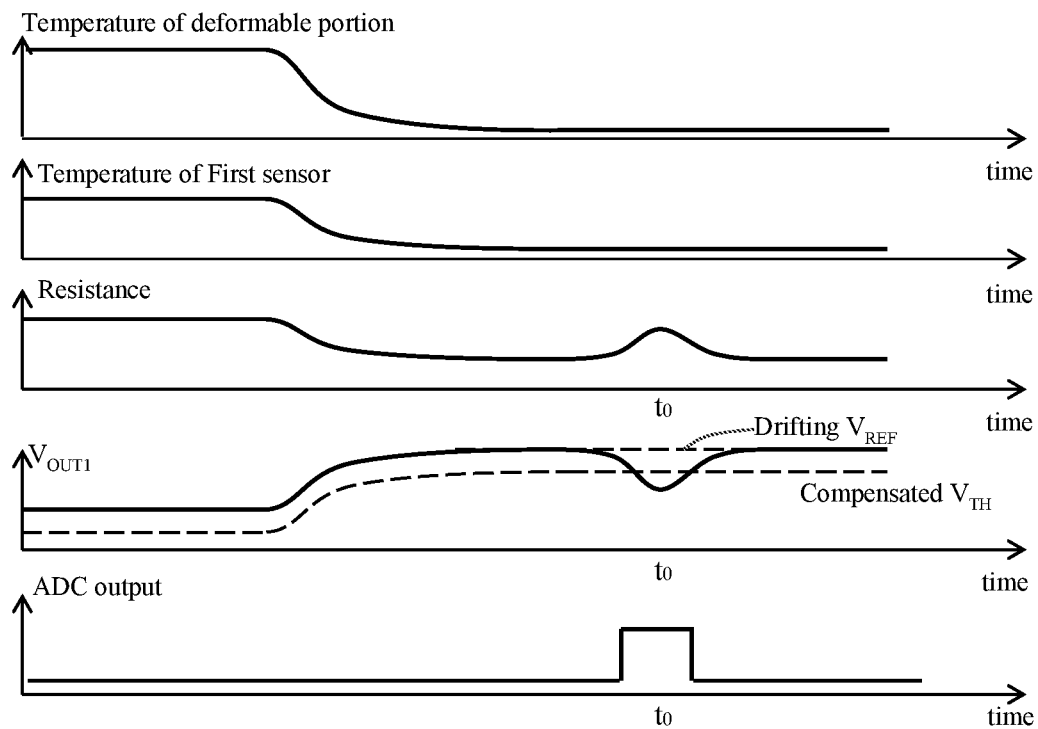
FIGS. 10a and 10b are schematic graphs of a change in signals with respect to a force and temperature at a deformable portion according to an embodiment of the present disclosure.
Figure 10B:
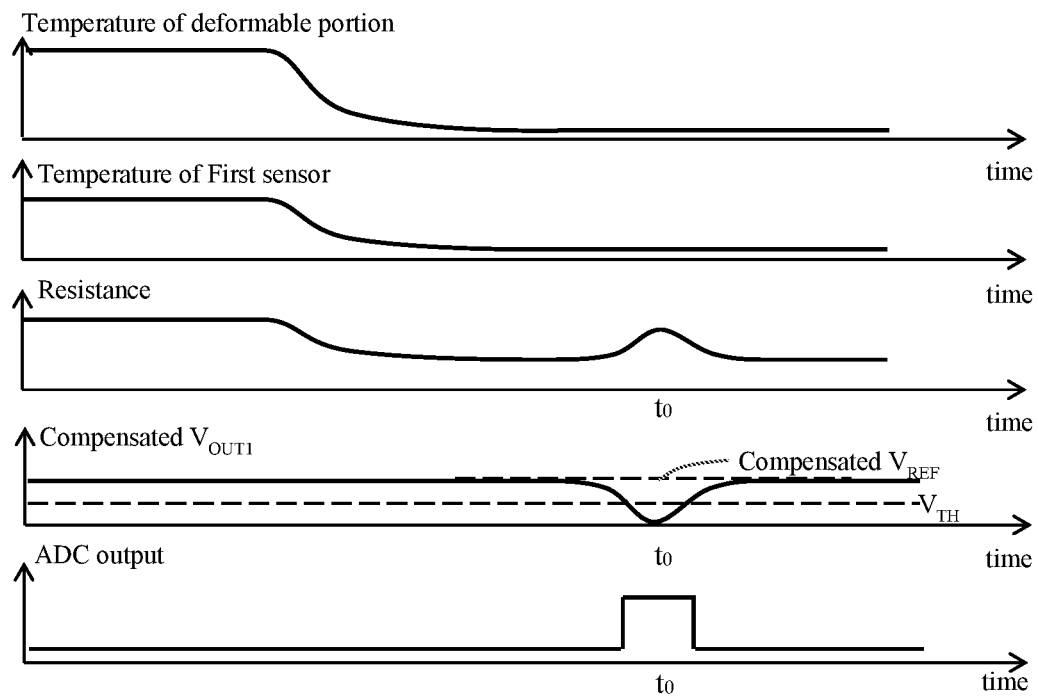

Reference is further made to FIGS. 10a and 10b, which are schematic diagrams of a change in signals with respect to a force (or a strain) and temperature at a deformable portion according to an embodiment of the present disclosure. Similar to FIG. 6, it is taken as example in FIGS. 10a and 10b that temperature at the deformable portion 11 is subject to a gradual decrease. In such case, temperature of the first strain-sensitive element 2110 is decreased with the temperature at the deformable portion 11, and the inverting input signal $V_{IN1}$ of the first operational amplifier 2120 is gradually decreased even when there is no deformation of the deformable portion 11. Similarly, the actual reference signal $V_{REF}$ would drift to a level higher than the expected reference signal $V_{REF}$.

Different from the example as shown in FIG. 6, the comparator 23 is capable to compensate the first signal $V_{OUT1}$ or the threshold signal $V_{TH}$ based on the second signal $V_{OUT2}$. The compensation may be carried out in various manners, for example, based on a look-up table and an interpolation algorithm, or based on a preset equation. Hereinafter described is an example in which the threshold signal $V_{TH}$ is compensated based on the second signal $V_{OUT2}$, through a look-up table and an interpolation algorithm.

For convenience of illustration, it is assumed that the second sensor is a temperature detector attached to the deformable portion, and the second signal $V_{OUT2}$ is represented by the detected temperature at the deformable portion. Table I is a look-up table recording a corresponding relationship between the second signal $V_{OUT2}$ and the threshold signal $V_{TH}$.

TABLE I

| Look-up table for $V_{OUT2}$ and $V_{TH}$ | | | | | | |
|---|---|---|---|---|---|---|
| $V_{OUT2}$ (° C.) | −20 | 0 | 20 | 40 | 60 | 80 |
| Compensated $V_{TH}$ (V) | 1.18 | 1.41 | 1.57 | 1.76 | 1.92 | 2.05 |

The look-up table as shown in Table I records seven value pairs of the second signal $V_{OUT2}$ and the threshold signal $V_{TH}$. In a case that the second signal $V_{OUT2}$ indicates that the temperature at the deformable portion 11 is equal to −20° C., 0° C., 20° C., 40° C., 60° C., or 80° C., a corresponding level of the threshold signal $V_{TH}$ can be directly read from the look-up table. Namely, the compensated threshold signal $V_{TH}$ can be directly acquired. In a case that the second signal $V_{OUT2}$ indicates temperature is another value, the threshold signal can be obtained through interpolation (or extrapolation) based on a following equation.

$$V_{THX} = V_{TH0} + \frac{V_{TH1} - V_{TH0}}{V_{OUT2\_1} - V_{OUT2\_0}}(V_{OUT2\_X} - V_{OUT2\_0})$$

$V_{OUT2\_X}$ represents the indicated temperature indicated by the second signal $V_{OUT2}$. $V_{THX}$ represents a value of the threshold signal $V_{TH}$ corresponding to $V_{OUT2\_X}$, namely, the compensated threshold signal $V_{TH}$ to be acquired. $V_{OUT2\_0}$ and $V_{OUT2\_1}$ represent two adjacent values of temperature recorded in the look-up table. $V_{OUT2\_X}$ is located in a range defined by $V_{OUT2\_0}$ and $V_{OUT2\_1}$ (for interpolation), or outside and in proximity to the range defined by $V_{OUT2\_0}$ and $V_{OUT2\_1}$ (for extrapolation). $V_{TH0}$ and $V_{TH1}$ represent values of the threshold signal $V_{TH}$ that correspond to $V_{OUT2\_0}$ and $V_{OUT2\_1}$, respectively.

It is appreciated that the values and the quantity of value pairs recorded in the look-up table of the above example are merely exemplary, and may be configured otherwise according to a practical situation. Generally, stable compensation requires that a difference between the threshold signal $V_{TH}$ and the reference signal $V_{REF}$ is constant or preset. Therefore, the look-up table may be configured based on a corresponding relationship between the second signal $V_{OUT2}$ and the reference signal $V_{REF}$ (as shown in Table II, where the difference is set to be 0.1V as an example). That is, values of the drifting reference signal $V_{REF}$ corresponding to values of the second signal $V_{OUT2}$ (for example, corresponding to multiple temperature points) may be first acquired, and then the corresponding values of the compensated threshold signal $V_{TH}$ are recorded based on the values of the drifting reference signal $V_{REF}$ and the difference between the threshold signal $V_{TH}$ and the reference signal $V_{REF}$. In other words, the threshold signal $V_{TH}$ is compensated "toward" the drifting reference signal $V_{REF}$. As an example, the corresponding relationship between the second signal $V_{OUT2}$ and the reference signal $V_{REF}$ may be as shown in Table II, where the corresponding relationship in Table I could be directly derived based on Table II when the difference between the threshold signal $V_{TH}$ and the reference signal $V_{REF}$ is 0.1V.

TABLE II

Look-up table for $V_{OUT2}$ and $V_{REF}$

| $V_{OUT2}$ (° C.) | −20 | 0 | 20 | 40 | 60 | 80 |
|---|---|---|---|---|---|---|
| Compensated $V_{REF}$ (V) | 1.08 | 1.3 | 1.47 | 1.66 | 1.82 | 1.95 |

Alternatively, the compensated threshold signal $V_{TH}$ may be calculated from the second signal $V_{OUT2}$ through a preset equation.

It is further appreciated that the first signal $V_{OUT1}$ may be compensated in manners similar to those for the threshold signal $V_{TH}$. In such case, the first signal $V_{OUT1}$ and the reference signal $V_{REF}$ may be compensated "toward" the threshold signal $V_{TH}$ based on the constant or preset difference between the threshold signal $V_{TH}$ and the reference signal $V_{REF}$. Unlike the threshold signal $V_{TH}$, the first signal $V_{OUT1}$ is subject to deformation at the deformable portion 11, and therefore the compensated values of the first signal $V_{OUT1}$ is based on both the second signal $V_{OUT2}$ and actual values of the first signal $V_{OUT1}$. A compensation amount for the first signal $V_{OUT1}$ is equal to a drifting amount of the reference signal $V_{REF}$, which may be obtained based on the second signal $V_{OUT2}$ in a manner similar to that for obtaining the compensated threshold signal $V_{TH}$, for example, from a look-up table or a preset equation. Then, the compensated first signal $V_{OUT1}$ is acquired by adding the compensation amount to the first signal $V_{OUT1}$ or subtracting the compensation amount from the first signal $V_{OUT1}$.

References are further made to FIG. 10a, which shows the compensated threshold signal $V_{TH}$ (Case A), and FIG. 10b, which shows the compensated first signal $V_{OUT1}$ (Case B), respectively. Similar to FIG. 6, it is taken as an example that the deformation of the deformable portion 11 induces a valley in the first signal $V_{OUT1}$, around the moment $t_0$ when the temperature has decreased.

In case A, the threshold signal $V_{TH}$ is compensated and thereby increased gradually, following the reference signal $V_{REF}$. In case B, the first signal $V_{OUT1}$ is compensated, and thereby the reference signal $V_{REF}$ is unchanged, following the threshold signal $V_{TH}$. Around a moment $t_0$, an external force same as the one induces the deformation as shown in FIG. 5 is applied to the deformable portion 11. Since the difference between the threshold signal $V_{TH}$ and the reference signal $V_{REF}$ stays constant after compensation in both cases, the first signal $V_{OUT1}$ dipping from reference signal $V_{REF}$ is capable to reach the threshold signal $V_{TH}$, as what should happen before the temperature decreases. Namely, a bottom of the valley in the first signal $V_{OUT1}$ is lower than the threshold signal $V_{TH}$. Accordingly, the comparator 23 turns the third signal $V_{OUT3}$ into the active state, the hardware module 12 is informed of the deformation of the deformable portion, and the electronic device 10 is capable to recognize the deformation around the moment $t_0$ and gives a proper response.

In this embodiment, it is taken as an example that the threshold signal $V_{TH}$ is lower than the reference signal $V_{REF}$, the deformation induces a valley in the first signal $V_{OUT1}$, the temperature is subject to a decrease, and the compensation would prevent the comparator 23 from giving a "false negative" result when determining whether the deformable portion 11 deforms. Another embodiment may be obtained by analogy, which also falls within the scope of the present disclosure. For example, the threshold signal $V_{TH}$ is higher than the reference signal $V_{REF}$ and the deformation induces a peak in the first signal $V_{OUT1}$. For another example, the temperature is subject to an increase, and the compensation would prevent the comparator 23 from giving a "false positive" result when determining whether the deformable portion 11 deforms.

As mentioned above, the second sensor 22 and the first sensor 21 may be of a same type, which can facilitate fabrication of the apparatus 20. Such configuration may require the second sensor 22 to be insensitive to the deformation of the deformable portion 11.

Figure 11:
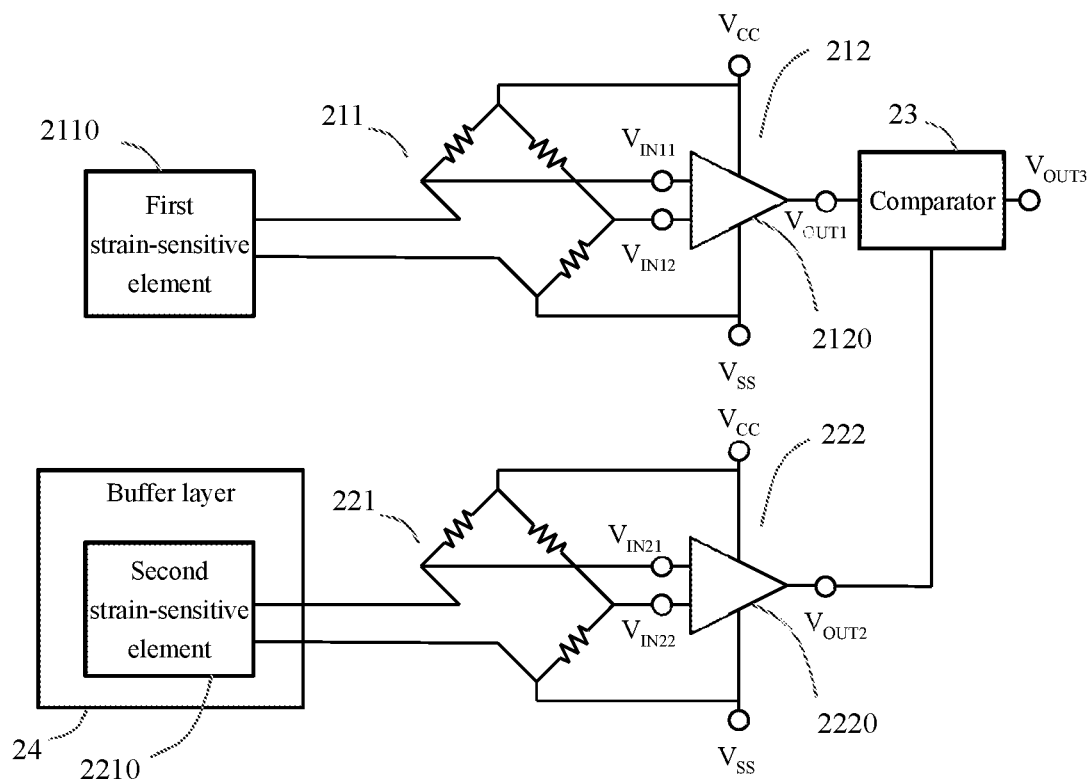
FIG. 11 is a schematic structural diagram of an apparatus for forcing sensing according to another embodiment of the present disclosure.

Reference is made to FIG. 11, which is a schematic structural diagram of an apparatus for forcing sensing according to another embodiment of the present disclosure. In FIG. 11, the apparatus 20 further includes a buffer layer 24, which is configured to buffer the second sensor 22 from the deformation of the deformable portion 11. The second sensor 22 includes a second Wheatstone-bridge circuit 221 and a second amplifier circuit 222. An arm of the second Wheatstone-bridge circuit 221 comprises a second strain-sensitive element 2210, and the second strain-sensitive element 2210 is attached to the buffer layer 24 at a side away from the deformable portion 11. The second amplifier circuit 222 comprises a second operational amplifier 2220, an inverting input terminal and a non-inverting input terminal of the second operational amplifier 2220 are coupled to two output terminals, respectively, of the second Wheatstone-bridge circuit 221, and an output terminal of the second operational amplifier 2220 is coupled to another input terminal of the comparator 23. The second signal $V_{OUT2}$ comprises a signal outputted from the output terminal of the second operational amplifier 2220. Details of a structure of the second Wheatstone-bridge circuit 221 and second amplifier circuit 222 may refer to the those of the first Wheatstone-bridge circuit 211 and the first amplifier circuit 212, which are not described again herein.

Unlike the first strain-sensitive element 2110 directly attached to the deformable portion 11, the second strain-sensitive element 2210 may be separated from the deformation by the buffer layer 24. The buffer layer 24 may be made of any material or any structure that is capable to buffer the deformation and has a high thermal conductivity. For example, the buffer layer may be polymer material, elastic material, a spring, or a cushion sheet with adhesive on both sides.

Figure 12:
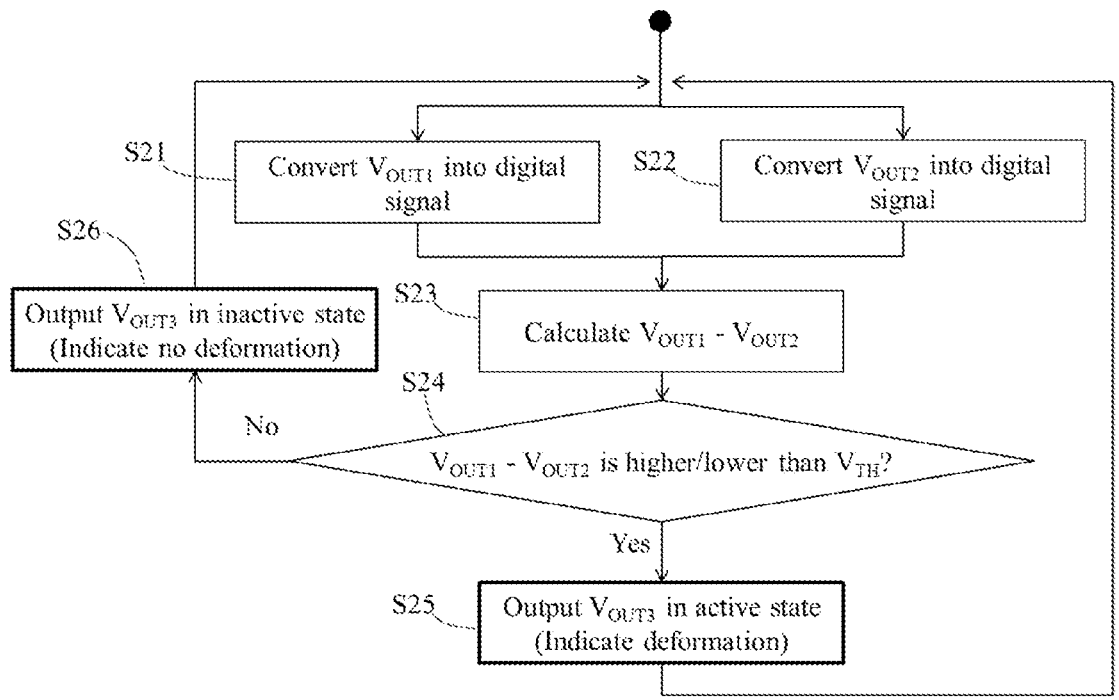
FIG. 12 is an operation algorithm of a comparator of an apparatus for force sensing according to another embodiment of the present disclosure.

In one embodiment, the first strain-sensitive element 2110 and the second strain-sensitive element 2210 may be identical to each other, which further facilitates design and fabrication of the apparatus 20. Other elements between the two Wheatstone-bridge circuits and the two amplifier circuits may be identical, or may be selected to ensure that the dependency of first signal $V_{OUT1}$ and the second signal $V_{OUT2}$ have a same dependency on the electrical characteristic of the strain-sensitive elements 2110 and 2210. Accordingly, the compensation on the first signal $V_{OUT1}$ based on the second signal $V_{OUT2}$ may be simplified as calculating a difference between the first signal $V_{OUT1}$ and the second signal $V_{OUT2}$. In such case, the operating algorithm of the comparator 23 may include steps S21 to S26 as shown in FIG. 12.

In step S21, the first signal $V_{OUT1}$ is converted into a digital signal.

In step S22, the second signal $V_{OUT2}$ is converted into a digital signal. It is appreciated that the step S22 may be omitted in a case that the second signal $V_{OUT2}$ is a digital signal.

Details of the steps S21 and S22 may refer to description of the steps S11 and S12, which is not described again herein.

In step S23, a difference between the first signal $V_{OUT1}$ and the second signal $V_{OUT2}$, namely, $V_{OUT1}-V_{OUT2}$, is calculated. Since the first signal $V_{OUT1}$ and the second signal $V_{OUT2}$ have a same dependency on the electrical characteristic of the strain-sensitive elements 2110 and 2210, the difference would be zero in case of the reference temperate and the reference degree of deformation (that is, the difference at the reference state is zero). In response to the deformation of the deformable portion 11, the first signal $V_{OUT1}$ is subject to an increase or a decrease, while the second signal $V_{OUT2}$ is unchanged or subject to little variation due to the deformation is buffered by, for example, the buffer layer 24. In response to a change in the temperature at the deformable portion 11, the first signal $V_{OUT1}$ and the second signal $V_{OUT2}$ are subject to same or approximate changes, due to high thermal conductivity of the buffer layer 24. Therefore, the difference between the first signal $V_{OUT1}$ and the second signal $V_{OUT2}$ is substantially equal to a change in the first signal $V_{OUT1}$ which is solely caused by the deformation of the deformable region 11. Namely, an influence of the temperature on the first signal $V_{OUT1}$ is eliminated.

Figure 13:
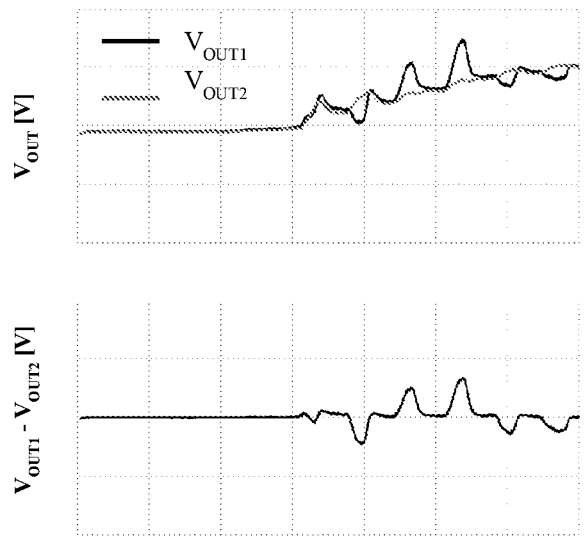
FIG. 13 is a schematic graph of a change in signals with respect to a force and temperature at a deformable portion according to another embodiment of the present disclosure.

Reference is made to FIG. 13, which shows an example of the changes in the first signal $V_{OUT1}$ and the second signal $V_{OUT2}$. In the upper subfigure, both reference signals for the first signal $V_{OUT1}$ and the second signal $V_{OUT2}$ drift to a higher level, which is caused by temperature that is gradually increasing or decreasing. Valleys and peaks in the first signal $V_{OUT1}$ are due to compressive and tensile forces (i.e., the deformation) at the deformable region 11. In the lower subfigure, the difference between the first signal $V_{OUT1}$ and the second signal $V_{OUT2}$ is calculated. Apparently, a reference level of $V_{OUT1}-V_{OUT2}$ is zero, and all valleys and peaks in $V_{OUT1}-V_{OUT2}$ share the zero-reference level as a baseline. Therefore, it is convenient to compare the valleys and the peaks with a preset threshold.

In step S24, it is determined whether the difference between the first signal $V_{OUT1}$ and the second signal $V_{OUT2}$ is lower (or higher) than the threshold signal $V_{TH}$. The operating algorithm goes to step S25 in case of positive determination, and goes to step S26 in case of negative determination. Since the influence of the temperature on the first signal $V_{OUT1}$ has been eliminated in the step S23, the threshold signal $V_{TH}$ may be directly set based on the threshold preset without considering the temperature, i.e., based on a to-be-recognized degree of the deformation.

In step S25, the third signal $V_{OUT3}$ is outputted in the active state. The active state indicates that the deformable portion 11 deforms.

In step S26, the third signal $V_{OUT3}$ is outputted in an inactive state. The inactive state is one or more states of the third signal $V_{OUT3}$ other than the active state, and indicates that the deformable portion 11 does not deform.

Details of the steps S25 and S26 may refer to description of the steps S15 and S16, which is not described again herein.

Figure 14:
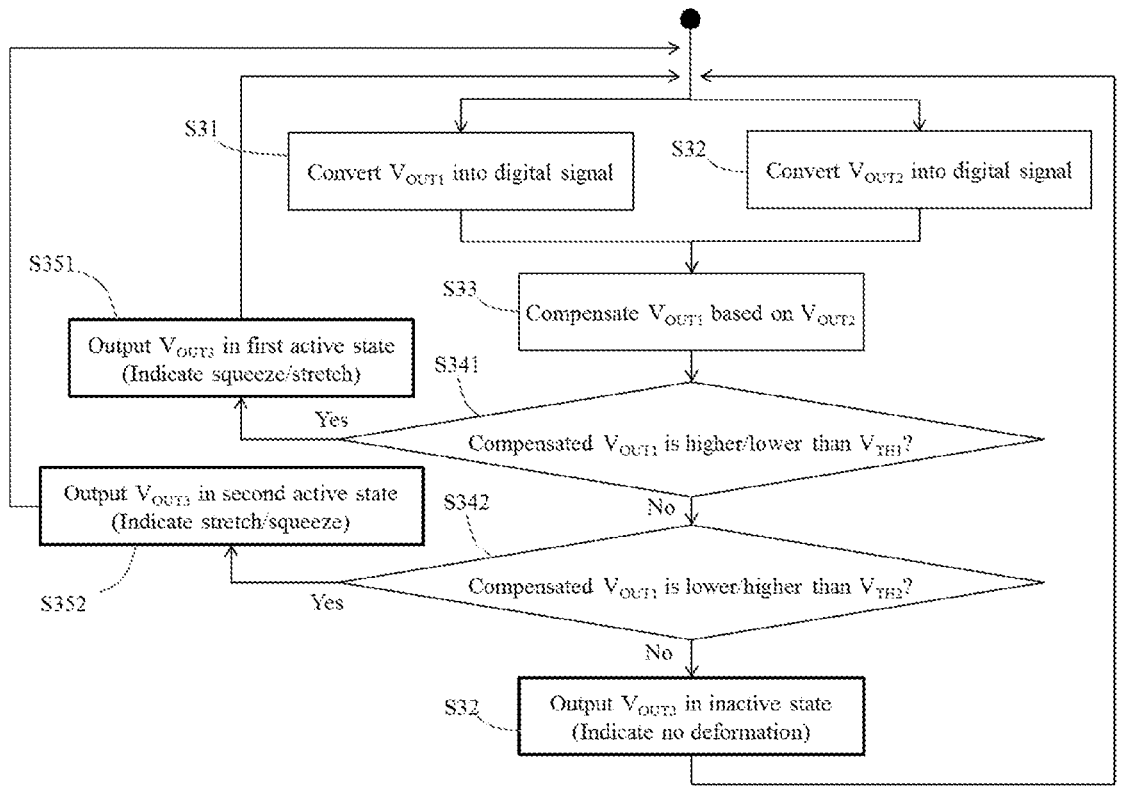
FIG. 14 is an operation algorithm of a comparator of an apparatus for force sensing according to another embodiment of the present disclosure.

The threshold signal $V_{TH}$ may include a set of signals, based on a quantity of degrees of the deformation that are to be recognized by the hardware model 12. For example, the threshold signal $V_{TH}$ may include one or more signals for compression, such that different degrees of compression (or squeezing input operations) can be recognized by the hardware model 12. Alternatively or additionally, the threshold signal $V_{TH}$ may include one or more signals for tension, such that different degrees of tension (or stretching input operations) can be recognized by the hardware model 12. Reference is made to FIG. 14, which shows an operating algorithm of the comparator 23 in a case that the threshold signal $V_{TH}$ may include a signal $V_{TH1}$ for compression and a signal $V_{TH2}$ for tension.

The operating algorithm shown in FIG. 14 is on a basis of that as shown in FIG. 8. The steps S31, S32 and S35 are same as the step S11, S12 and S15 in FIG. 8, and hence may refer to the relevant description for FIG. 8. The step S33 is an option of the step S13 to facilitate illustration, that is, the first signal $V_{OUT1}$ is compensated based on the second signal $V_{OUT2}$ in the step S33. Correspondingly, the operating algorithm then goes to steps S341 and S342, to compare the compensated first signal $V_{OUT1}$ with the threshold signal $V_{TH}$.

In step S341, it is determined whether the compensated first signal $V_{OUT1}$ is lower (or higher) than the signal $V_{TH1}$ for compression. The operating algorithm goes to step S351 in case of positive determination, and goes to step S342 in case of negative determination.

In step S342, it is determined whether the compensated first signal $V_{OUT1}$ is higher (or lower) than the signal $V_{TH2}$ for tension. The operating algorithm goes to step S352 in case of positive determination, and goes to step S32 in case of negative determination.

Some details of the steps S341 and S342 may refer to the description of the step S14, and are not repeated herein. It is noted that although the step S341 is performed before the step S342 in FIG. 14, a sequence of the two steps are not limited. For example, the determination in the step S342 may be performed before the determination in the step S341. For another example, the two steps may be simultaneously performed, and then the algorithm goes to steps S351, S352, or S36 based on determination results of both steps S341 and S342.

In step S351, the third signal $V_{OUT3}$ is outputted in a first active state. The first active state may indicate that the deformable portion 11 is squeezed (or stretched).

In step S352, the third signal $V_{OUT3}$ is outputted in a second active state. The second active state may indicate that the deformable portion 11 is stretched (or squeezed).

It is appreciated that either of the first active state or the second active state may indicate a squeezing input on the deformable portion 11, as long as the other indicate a stretching input. The first active state and the second active state may be a same state or different states according to a practical requirement. For example, the first active state and the second active state may be identical in a case that the electronic device are configured to trigger a same operation in response to both a squeezing input and a stretching input.

Figure 15A:
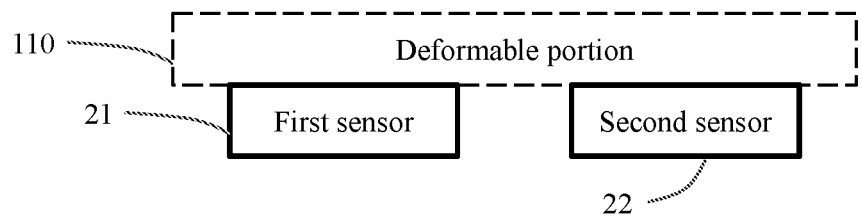
FIGS. 15a to 16b are schematic diagrams of a cross-sectional view of an arrangement of a first sensor and a second sensor with respect to a deformable portion according to embodiments of the present disclosure.
Figure 15B:
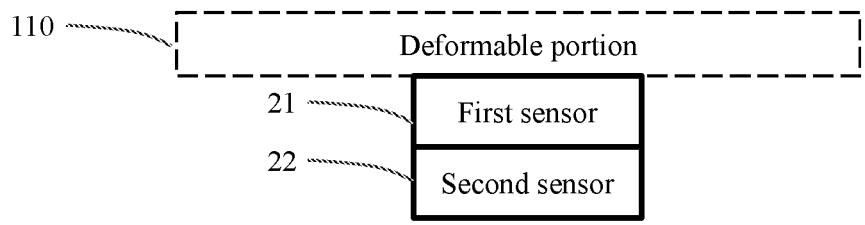

The first sensor 21 and the second sensor 22 may be attached to the deformable portion 11 in various manners. Reference is made to FIGS. 15a and 15b, which are schematic diagrams of a cross-sectional view of an arrangement of a first sensor and a second sensor with respect to a deformable portion according to an embodiment of the present disclosure.

In one embodiment, both the first sensor 21 and the second sensor 22 are attached to the deformable portion 11, and the second sensor 22 is in proximity to the first sensor 21, as shown in FIG. 15a. The second sensor 22 may be adjacent to the first sensor 21, or there may be a gap between the first sensor 21 and the second sensor 22. The gap between the first sensor 21 and the second sensor 22 may facilitate the deformation of the deformable portion 11. In a case that a size of the deformable portion 11 is small, the second sensor 22 may be alternatively disposed out of the deformable portion 11 while keeping in proximity of the first sensor 21. It is appreciated that the lower the thermal conductivity of the deformable portion 22 is, the closer the first sensor 21 and the second sensor 22 should be, in order to make an accurate compensation based on the second signal $V_{OUT2}$.

In another embodiment, the second sensor 22 is attached to at least a part of the first sensor 21 at a side away from the deformable portion 11, as shown in FIG. 15b. Such arrangement would achieve an accurate compensation when the thermal conductivity along a thickness direction of the first sensor 21 is high.

Figure 15C:
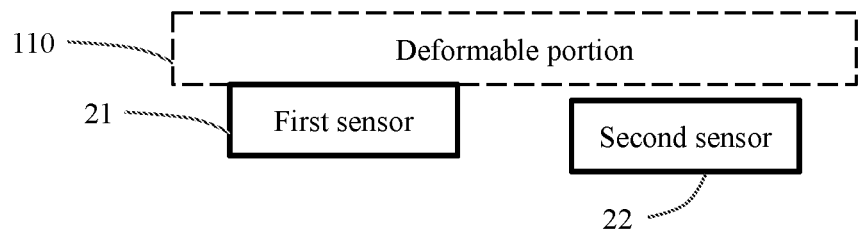
Figure 15D:
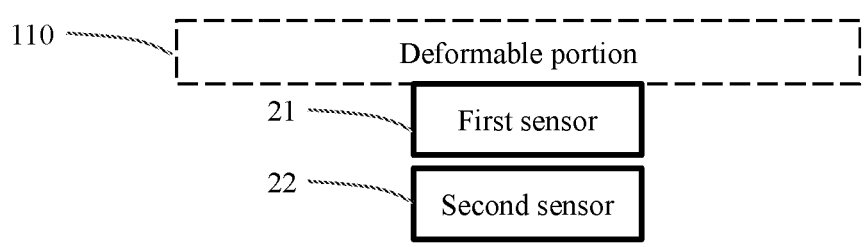

In another embodiment, the second signal $V_{OUT2}$ may be generated by detecting the temperature of the deformable portion 110 in a non-contacting manner. For example, the temperature is detected based on infrared light or visible light. In such case, there may be a gap between the second sensor 22 and the deformable portion 110, as shown in FIG. 15c, or between the second sensor 22 and the first sensor 21, as shown in FIG. 15d.

It is appreciated that in some embodiments, a part of the second sensor 22 may be attached to the first sensor 21, while another part of the second sensor 22 may be attached to the deformable region 11.

Figure 16A:
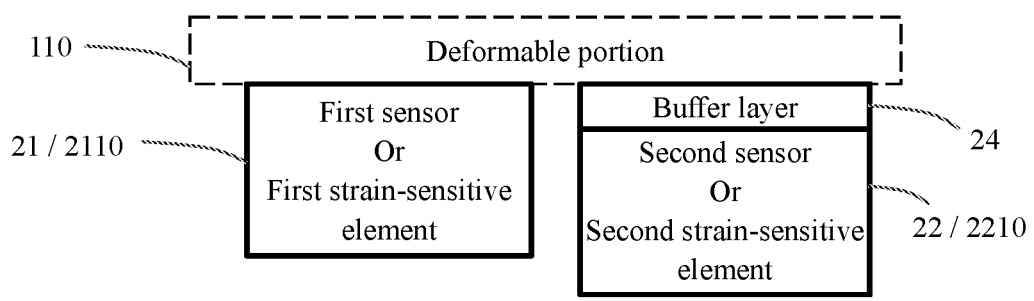
Figure 16B:
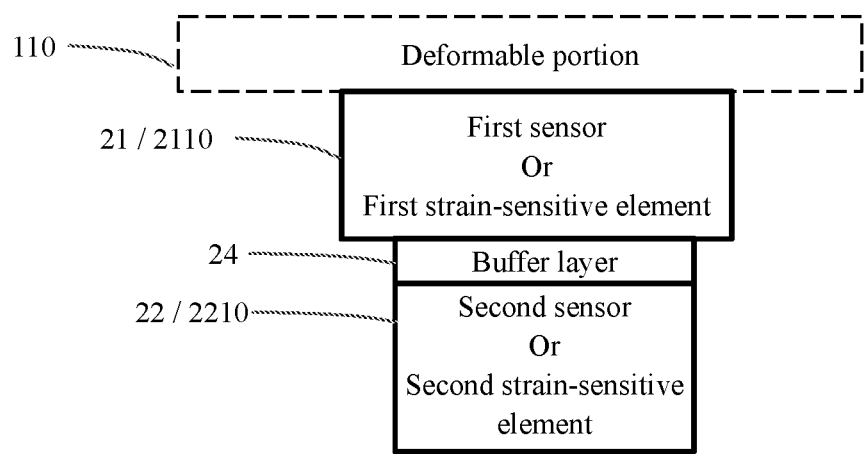

As described above, the first sensor 21 and the second sensor 22 are of a same type. For example, the first sensor 21 and the second sensor 22 may include the first strain-sensitive element 2110 and the second strain-sensitive element 2210, respectively, and the apparatus 20 includes a buffer layer 24 which buffers the second sensor 22 from deformation of the deformable portion 11, as shown in FIG. 11. Reference is made to FIGS. 16a and 16b, which are schematic diagrams of a cross-sectional view of another arrangement of a first sensor and a second sensor on a basis of FIGS. 15a and 15b, respectively. In FIG. 16a, the first sensor 21 (or the first strain-sensitive element 2110) and the buffer layer 24 are attached to the deformable portion 110, and the second senor 22 (or the second strain-sensitive element 2210) is attached to the buffer layer 24 at a side away from the deformable portion 110. In FIG. 16b, the first sensor 21 (or the first strain-sensitive element 2110) is attached to the deformable portion 110, the buffer layer 24 is attached to the first sensor 21 at a side away from the deformable portion 110, and the second senor 22 (or the second strain-sensitive element 2210) is attached to the buffer layer 24 at a side away from the deformable portion 110, i.e., a side away from the first sensor 21 (or the first strain-sensitive element 2110).

In some embodiments, there may be multiple first sensors 21 or multiple second sensors 22. For example, each first sensor 21 may correspond to one or more second sensors 22, or each second sensor 22 may correspond to one or more first sensors 21.

In one embodiment, the first signal $V_{OUT1}$ is generated by one first sensor 21, while the second signal $V_{OUT2}$ are generated by multiple second sensors 22. Namely, information of the deformation is detected by one channel, and information of the temperature is compensated based on multiple channels. In such case, the second signal $V_{OUT2}$ may be obtained based on output signals from all of the multiple second sensors 22. For example, the second signal $V_{OUT2}$ is an average of those output signals. For another example, the second signal $V_{OUT2}$ is a weighted average of those output signals, where a weight of each output signal is determined by a distance between the first sensor 21 and the second sensor 22 that corresponds to such output signal. The second signal $V_{OUT2}$ may be calculated in other appropriate manners, which is not enumerated herein.

In one embodiment, there may be multiple first sensors 21, each of which corresponds to one second sensor 22. The multiple first sensors 21 may be located at different regions of the deformable portion 11. Each region may correspond to one or more first sensors that operate as a group, and each group of first sensors 21 generates a channel of the first signal $V_{OUT1}$ that is coupled to the comparator 23. The comparator 23 is further configured to determine whether each of the different regions deforms, based on an output signal of the corresponding first sensor(s) 21, an output signal of the second sensor(s) 22 corresponding to such first sensor(s) 21, and the threshold signal $V_{TH}$.

An electronic device is further provided according to embodiments of the present disclosure. Reference is made to FIG. 7, where the electronic device 10 may include the aforementioned apparatus 20 for force sensing, the deformable region 11, and a hardware module 12. The hardware module is configured to receive the third signal $V_{OUT3}$, and a state of the hardware module changes in response to the third signal $V_{OUT3}$ being active. In one embodiment, the hardware module may be a controller, a processor, a display, a speaker, a switch, an indicator light, or the like. It is appreciated that the hardware module may be in other forms, as long as it can change a state thereof according to the third signal $V_{OUT3}$.

The electronic device 10 may include a mobile phone, a watch, glasses, an earbud, a keyboard, a tablet, or the like. The apparatus 20 for force sensing may be configured based on a structure of the electronic device 10 in practice. For example, the electronic device 10 is an earbud, a housing of the earbud includes a deformable cap (an outer shell), and a user can operate the earbud by squeezing or pressing the deformable cap. In such case, the apparatus 20 for force sensing may be located inside the housing, and the first sensor 21 (or the first strain-sensitive element 2110) is attached to an inner side of the deformable cap. The second sensor 22 may be attached to the inner side of the deformable cap or attached to the first sensor 21, similar to the embodiments as shown in FIGS. 15a to 16b. The comparator 23 may be integrated on a print circuit board (PCB) which is enclosed by the housing. For another example, the electronic device 10 is a foldable display device, a flexible display panel of the device is provided with a folding axis, and a user can switch on the device by opening the folded display panel. In such case, the apparatus 20 for force sensing may be located inside a foldable region of the display panel, and the first sensor 21 (or the first strain-sensitive element 2110) is attached to an inner side of the display screen at the foldable region. The second sensor 22 may be attached to the inner side of the display screen at the foldable region or attached to the first sensor 21, similar to the embodiments as shown in FIGS. 15a to 16b. The comparator 23 may be integrated in a processor of the display device.

A method for force sensing is further provided according to embodiments of the present disclosure. The method is applied to an electronic device, and may include steps S101 to S105.

In step S101, at least one first sensor generates a first signal, based on deformation of a deformable portion of the electronic device and temperature at the deformable portion.

In step S102, at least one second sensor generates a second signal based on the temperature at the deformable portion.

A sequence of the step S101 and the step S102 is not limited here. The step S101 may be performed before, after, or when the step S102 is performed.

In step S103, a comparator receives the first signal and the second signal.

In step S104, the comparator determines, based on the first signal, the second signal, and a threshold signal, whether the deformable portion deforms. The threshold signal corresponds to a degree of the deformation.

In step S105, the comparator generates a third signal which is in an active state in response to determining that the deformable portion deforms.

In one embodiment, the step S105 includes steps S1051 and S1052.

In step S1051, one of the first signal and the threshold signal is compensated based on the second signal, to generate a compensated signal.

In step S1052, the comparator compares the compensated signal with another of the first signal and the threshold signal, to generate the third signal.

It is appreciated that the steps S1051 may be implemented by the comparator, or implemented by another functional circuit.

In one embodiment, the threshold signal may include a threshold signal for compression. The step S104 includes that the comparator determines whether the deformable portion is squeezed, based on the first signal, the second signal, and the threshold signal for compression. The third signal is in the active state in response to the deformable portion being squeezed.

In one embodiment, the threshold signal may include a threshold signal for tension. The step S104 includes that the comparator determines whether the deformable portion is stretched, based on the first signal, the second signal, and the threshold signal for tension. The third signal is in the active state in response to the deformable portion being stretched.

In one embodiment, there are multiple first sensors, each of which corresponds to one second sensor, and the multiple first sensors are located at different regions of the deformable portion. The step S104 includes that the comparator determines whether each of the different regions deforms, based on an output signal of the corresponding first sensor, an output signal of the corresponding second sensor, and the threshold signal.

The embodiments of the present disclosure are described in a progressive manner, and each embodiment places emphasis on the difference from other embodiments. Therefore, one embodiment can refer to other embodiments for the same or similar parts. Since the methods disclosed in the embodiments correspond to the apparatuses disclosed in the embodiments, the description of the methods is simple, and reference may be made to the relevant part of the apparatuses.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. An apparatus for force sensing, located in an electronic device, wherein the electronic device comprises a deformable portion, and the apparatus comprises:
at least one first sensor, configured to generate a first signal, wherein the first signal is determined by deformation of the deformable portion and temperature at the deformable portion;
at least one second sensor, configured to generate a second signal, wherein the second signal is determined by the temperature at the deformable portion; and
a comparator, configured to:
receive the first signal and the second signal;
determine whether the deformable portion deforms, based on the first signal, the second signal, and a threshold signal, wherein the threshold signal corresponds to a degree of the deformation; and
generate a third signal, wherein the third signal is in an active state in response to determining that the deformable portion deforms.

2. The apparatus according to claim 1, wherein:
one of the first signal and the threshold signal is compensated based on the second signal, to generate a compensated signal; and
the comparator is further configured to generate the third signal by comparing the compensated signal with another of the first signal and the threshold signal.

3. The apparatus according to claim 2, wherein:
the first signal is compensated based on the second signal, and the compensated signal is a difference between the first signal and the second signal.

4. The apparatus according to claim 2, wherein:
the one of the first signal and the threshold signal is compensated based on a look-up table, and the look-up table records a corresponding relationship between the compensated signal and the second signal.

5. The apparatus according to claim 1, wherein:
the at least one first sensor comprises a first Wheatstone-bridge circuit and a first amplifier circuit;
an arm of the first Wheatstone-bridge circuit comprises a first strain-sensitive element, and the first strain-sensitive element is attached to the deformable portion;
the first amplifier circuit comprises a first operational amplifier, an inverting input terminal and a non-inverting input terminal of the first operational amplifier are coupled to two output terminals, respectively, of the first Wheatstone-bridge circuit, and an output terminal of the first operational amplifier is coupled to an input terminal of the comparator; and
the first signal comprises a signal outputted from the output terminal of the first operational amplifier.

6. The apparatus according to claim 5, wherein:
the first strain-sensitive element comprises two contacts separated by a gap, and a contact resistance between the two contacts changes monotonously with a width of the gap.

7. The apparatus according to claim 1, further comprising a buffer layer, wherein:
the buffer layer is configured to buffer one or more of the at least one second sensor from the deformation of the deformable portion;
the one or more second sensors comprises a second Wheatstone-bridge circuit and a second amplifier circuit;
an arm of the second Wheatstone-bridge circuit comprises a second strain-sensitive element, and the second strain-sensitive element is attached to the buffer layer at a side away from the deformable portion;
the second amplifier circuit comprises a second operational amplifier, an inverting input terminal and a non-inverting input terminal of the second operational amplifier are coupled to two output terminals, respectively, of the second Wheatstone-bridge circuit, and an output terminal of the second operational amplifier is coupled to another input terminal of the comparator; and
the second signal comprises a signal outputted from the output terminal of the second operational amplifier.

8. The apparatus according to claim 1, wherein:
the threshold signal comprises a threshold signal for compression;
the comparator is further configured to determine whether the deformable portion is squeezed, based on the first signal, the second signal, and the threshold signal for compression; and
the third signal is in the active state in response to the deformable portion being squeezed.

9. The apparatus according to claim 1, wherein:
the threshold signal comprises a threshold signal for tension;
the comparator is further configured to determine whether the deformable portion is stretched, based on the first signal, the second signal, and the threshold signal for tension; and
the third signal is in the active state in response to the deformable portion being stretched.

10. The apparatus according to claim 1, wherein:
one of the at least one second sensor is attached to the deformable portion for contacting temperature sensing, or separated from the deformable portion by a gap for non-contacting temperature sensing, and
the one of the at least one second sensor is located in proximity to the first strain-sensitive element.

11. The apparatus according to claim 1, wherein:
one of the at least one second sensor is attached to at least a part of the first strain-sensitive element for contacting temperature sensing, or separated from at least a part of the first strain-sensitive element for non-contacting temperature sensing, at a side away from the deformable portion.

12. The apparatus according to claim 1, wherein:
a quantity of the at least one first sensor is one, and a quantity of the at least one second sensor is more than one; and
the second signal is obtained based on output signals from all second sensors.

13. The apparatus according to claim 12, wherein the second signal is obtained based on an average of the output signals from all second sensors; or
wherein the second signal is obtained based on a weighted average of the output signals from all second sensors, and a weight of each output signal is determined by a distance between the first sensor and the corresponding second sensor.

14. The apparatus according to claim 1, wherein:
a quantity of the at least one first sensor is more than one, and each of the at least one first sensor corresponds to one of the at least one second sensor;
the first sensors are located at different regions of the deformable portion; and
the comparator is further configured to determine whether each of the different regions deforms, based on an output signal of the corresponding first sensor, an output signal of the corresponding second sensor, and the threshold signal.

15. An electronic device, comprising:
the apparatus according to claim 1;
the deformable portion; and
a hardware module, configured to receive the third signal, wherein a state of the hardware module changes in response to the third signal being in the active state.

16. A method for force sensing, applied to an electronic device, comprising:
generating, by at least one first sensor, a first signal based on deformation of a deformable portion of the electronic device and temperature at the deformable portion;
generating, by at least one second sensor, a second signal based on the temperature at the deformable portion;
receiving the first signal and the second signal, by analog-to-digital comparator, comparator;
determining, by the comparator based on the first signal, the second signal, and a threshold signal, whether the deformable portion deforms, wherein the threshold signal corresponds to a degree of the deformation; and
generating a third signal by the comparator, wherein the third signal is in an active state in response to determining that the deformable portion deforms.

17. The method according to claim 16, wherein generating the third signal comprises:
compensating one of the first signal and the threshold signal based on the second signal, to generate a compensated signal; and
comparing, by the comparator, the compensated signal with another of the first signal and the threshold signal, to generate the third signal.

18. The method according to claim 16, wherein:
the threshold signal comprises a threshold signal for compression;
the determining whether the deformable portion deforms comprises: determining whether the deformable portion is squeezed, based on the first signal, the second signal, and the threshold signal for compression; and
the third signal is in the active state in response to the deformable portion being squeezed.

19. The method according to claim 16, wherein:
the threshold signal comprises a threshold signal for tension;
the determining whether the deformable portion deforms comprises: determining whether the deformable portion is stretched, based on the first signal, the second signal, and the threshold signal for tension; and
the third signal is in the active state in response to the deformable portion being stretched.

20. The method according to claim 16, wherein:
a quantity of the at least one first sensor is more than one, and each of the at least one first sensor corresponds to one of the at least one second sensor;

the first sensors are located at different regions of the deformable portion; and the determining whether the deformable portion deforms comprises:

determining whether each of the different regions deforms, based on an output signal of the corresponding first sensor, an output signal of the corresponding second sensor, and the threshold signal.

\* \* \* \* \*